US011994455B2

(12) United States Patent
Peterman et al.

(10) Patent No.: US 11,994,455 B2
(45) Date of Patent: May 28, 2024

(54) ANALYTE QUANTITATION USING RAMAN SPECTROSCOPY

(71) Applicant: OndaVia, Inc., Hayward, CA (US)

(72) Inventors: Mark Charles Peterman, Fremont, CA (US); Merwan Benhabib, San Francisco, CA (US)

(73) Assignee: OndaVia, Inc., Hayward, CA (US)

( * ) Notice: Subject to any disclaimer, the term of this patent is extended or adjusted under 35 U.S.C. 154(b) by 0 days.

(21) Appl. No.: 17/710,244

(22) Filed: Mar. 31, 2022

(65) Prior Publication Data

US 2022/0317014 A1 Oct. 6, 2022

Related U.S. Application Data

(60) Provisional application No. 63/169,504, filed on Apr. 1, 2021.

(51) Int. Cl.
*G01N 15/06* (2006.01)
*G01J 3/44* (2006.01)
*G01N 15/075* (2024.01)

(52) U.S. Cl.
CPC ............ *G01N 15/06* (2013.01); *G01J 3/4406* (2013.01); *G01N 15/075* (2024.01)

(58) Field of Classification Search
CPC ............ G01N 15/06; G01N 2015/0693; G01J 3/4406
USPC ....................................................... 356/301
See application file for complete search history.

(56) References Cited

U.S. PATENT DOCUMENTS

| | | | |
|---|---|---|---|
| 5,266,498 | A | 11/1993 | Tarcha et al. |
| 5,563,031 | A | 10/1996 | Yu |
| 6,174,677 | B1 | 1/2001 | Vo-Dinh |
| 6,972,173 | B2 | 12/2005 | Su et al. |
| 8,070,956 | B2 | 12/2011 | Peterman et al. |
| 8,702,976 | B2 | 4/2014 | Peterman |
| 9,863,924 | B2 | 1/2018 | Peterman et al. |
| 10,247,673 | B2 | 4/2019 | Peterman et al. |
| 10,254,229 | B2 | 4/2019 | Peterman et al. |
| 10,444,216 | B2 | 10/2019 | Peterman et al. |
| 10,684,267 | B2 | 6/2020 | Peterman et al. |
| 10,895,564 | B2 | 1/2021 | Peterman et al. |

(Continued)

FOREIGN PATENT DOCUMENTS

CN 103439160 A 12/2013
CN 112161959 A * 1/2021 ............. G01N 21/31

(Continued)

OTHER PUBLICATIONS

U.S. Appl. No. 16/280,651, Final Office Action dated Mar. 3, 2021.
(Continued)

*Primary Examiner* — Michael A Lyons
*Assistant Examiner* — Omar H Nixon

(57) ABSTRACT

An analyte in water is quantified by mixing an internal standard with a water sample. The sample is analyzed with a Raman spectrometer. The analysis includes mapping the signal from the Raman spectrometer to the quantity of said analyte. The mapping can include using a calibration curve, for example a multivariate calibration curve, that was previously prepared with the internal standard. In other examples, a sample is measured after addition of a known amount of the analyte.

20 Claims, 11 Drawing Sheets

(56) References Cited

U.S. PATENT DOCUMENTS

| | | | |
|---|---|---|---|
| 2004/0058058 A1 | 3/2004 | Shchegolikhin et al. |
| 2004/0110208 A1 | 6/2004 | Chan et al. |
| 2004/0126279 A1 | 7/2004 | Renzi et al. |
| 2004/0142484 A1 | 7/2004 | Berlin et al. |
| 2004/0174520 A1 | 9/2004 | Premasiri et al. |
| 2004/0191921 A1 | 9/2004 | Farquharson et al. |
| 2006/0054506 A1 | 3/2006 | Natan et al. |
| 2006/0061762 A1 | 3/2006 | Dwight et al. |
| 2006/0144786 A1 | 7/2006 | Lin et al. |
| 2006/0164636 A1 | 7/2006 | Islam et al. |
| 2006/0166302 A1 | 7/2006 | Clarke et al. |
| 2006/0240401 A1 | 10/2006 | Clarke et al. |
| 2006/0257968 A1 | 11/2006 | Van Duyne et al. |
| 2006/0260941 A1 | 11/2006 | Tan et al. |
| 2006/0262303 A1 | 11/2006 | Bonne et al. |
| 2007/0010026 A1 | 1/2007 | Nguyen et al. |
| 2007/0059203 A1 | 3/2007 | Burrell et al. |
| 2007/0127019 A1 | 6/2007 | Zribi et al. |
| 2007/0155020 A1 | 7/2007 | Su et al. |
| 2007/0224683 A1 | 9/2007 | Clarke et al. |
| 2007/0236697 A1 | 10/2007 | Zribi et al. |
| 2008/0316480 A1 | 12/2008 | Zhong et al. |
| 2009/0053818 A1 | 2/2009 | Zhang et al. |
| 2011/0207231 A1 | 8/2011 | Natan et al. |
| 2011/0266429 A1 | 11/2011 | Vestel et al. |
| 2013/0271758 A1 | 10/2013 | Marchant et al. |
| 2013/0323856 A1 | 12/2013 | Martel et al. |
| 2014/0171759 A1* | 6/2014 | White | A61B 5/6835 600/306 |
| 2014/0186939 A1 | 7/2014 | Peterman et al. |
| 2014/0260708 A1 | 9/2014 | Harrell et al. |
| 2015/0218615 A1 | 8/2015 | Siegel et al. |
| 2017/0074799 A1 | 3/2017 | Peterman |
| 2018/0031483 A1* | 2/2018 | Singamaneni | G01N 21/554 |
| 2019/0257760 A1 | 8/2019 | Peterman et al. |
| 2019/0277765 A1* | 9/2019 | Peterman | G01N 21/658 |
| 2021/0151131 A1* | 5/2021 | Wilks | G01N 21/3103 |

FOREIGN PATENT DOCUMENTS

| | | |
|---|---|---|
| JP | 2007218866 A | 8/2007 |
| WO | 2017198993 A1 | 11/2017 |

OTHER PUBLICATIONS

Beckers et al., "The Preparation of Background Electrolytes in Capillary Zone Electrophoresis: Golden Rules and Pitfalls," Electrophoresis, Jan. 2003, vol. 24 (3), pp. 518-535.
European Patent Application No. 16847409.6, Communication pursuant to Article 94(3) EPC dated Sep. 3, 2020.
European Patent Application No. 16847409.6, Extended European Search Report dated Mar. 6, 2019.
Henderson et al., "Appendix 1: Naturally Occuring Isotopes. Mass Spectrometry of Inorganic, Coordination and Organometallic Compounds: Tools-Techniques-Tips," John Wiley & Sons Ltd, 2005, pp. 235-246.
International Patent Application No. PCT/US2016/052178, International Preliminary Report on Patentability, dated Mar. 29, 2018.
International Patent Application No. PCT/US2016/052178, International Search Report and Written Opinion dated Nov. 18, 2016.
International Patent Application No. PCT/US2019/021778, International Preliminary Report on Patentability dated Sep. 15, 2020.
International Patent Application No. PCT/US2019/021778, International Search Report and Written Opinion dated Aug. 30, 2019.
Jencks et al., "Equilibrium Deuterium Isotope Effects on the Ionization of Thiol Acids," Journal of the American Chemical Society, Sep. 1971, vol. 93 (18), pp. 4433-4436.
Lee et al., "Amine-Functionalized Gold Nanoparticles as Non-Cytotoxic and Efficient Intracellular siRNA Delivery Carriers," International Journal of Pharmaceutics, Nov. 2008, vol. 364 (1), pp. 94-101.

Peterman, Mark, "Rapid Contaminant Monitoring," OndaVia Inc., Oct. 2012, 27 pages.
Marz et al., "Towards a Quantitative SERS Approach—Online Monitoring of Analytes in a Microfluidic System with Isotope-Edited Internal Standards," Journal of Biophotonics, Mar. 2009, vol. 2 (4), pp. 232-242.
Ondavia, "Basic Analysis System," available at https://www.ondavia.com/basic, accessed Jul. 2017, 1 page.
U.S. Appl. No. 14/198,163, Final Office Action dated Apr. 30, 2018.
U.S. Appl. No. 14/198,163, Notice of Allowance dated Nov. 20, 2018.
U.S. Appl. No. 15/239,153, Notice of Allowance dated Nov. 30, 2018.
U.S. Appl. No. 15/792,165, Notice of Allowance dated Nov. 29, 2019.
U.S. Appl. No. 15/792,165, Non-Final Office Action dated Apr. 9, 2018.
U.S. Appl. No. 14/198,163, Final Office Action dated Jul. 18, 2017.
U.S. Appl. No. 14/198,163, Non-Final Office Action dated Nov. 24, 2017.
U.S. Appl. No. 14/198,163, Office Action dated Apr. 7, 2016.
U.S. Appl. No. 14/198,163, Office Action dated Jan. 8, 2016.
U.S. Appl. No. 14/198,163, Office Action dated Jan. 19, 2017.
U.S. Appl. No. 14/198,163, Office Action dated Jul. 20, 2016.
U.S. Appl. No. 14/198,163, Office Action dated May 7, 2015.
U.S. Appl. No. 15/239,153, Non-Final Office Action dated Apr. 5, 2018.
U.S. Appl. No. 15/267,708, Non-Final Office Action dated Sep. 22, 2017.
U.S. Appl. No. 15/267,708, Notice of Allowance dated Nov. 15, 2017.
U.S. Appl. No. 15/792,165, Final Office Action dated Nov. 30, 2018.
U.S. Appl. No. 15/792,165, Non-Final Office Action dated Jun. 13, 2019.
U.S. Appl. No. 15/821,098, Non-Final Office Action dated Dec. 13, 2018.
U.S. Appl. No. 15/821,098, Notice of Allowance dated Jun. 6, 2019.
U.S. Appl. No. 16/280,651, Non-Final Office dated Aug. 12, 2020.
U.S. Appl. No. 16/870,530, Notice of Allowance dated Nov. 5, 2020.
U.S. Appl. No. 16/870,530, Notice of Allowance dated Sep. 21, 2020.
U.S. Appl. No. 16/560,579, Notice of Allowance dated Feb. 10, 2020.
Yazgan et al., "Detection of Melamine in Milk by Surfaceenhanced Raman Spectroscopy Coupled with Magnetic and Raman-Labeled Nanoparticles", Analytical and Bioanal Ytical Chemistry, Springer, Berlin, De, May 4, 2012, vol. 403 (7), pp. 2009-2017.
Yin et al., "Quantitative Analysis of Mononucleotides by Isotopic Labeling Surface-Enhanced Raman Scattering Spectroscopy," Biosensors and Bioelectronics, 2011, vol. 26 (12), pp. 4828-4831.
Zhang et al., "Isotope Edited Internal Standard Method for Quantitative Surface-Enhanced Raman Spectroscopy," Analytical Chemistry, Apr. 2005, vol. 77 (11), pp. 3563-3569.
Zong et al."Surface-Enhanced Raman Spectroscopy for Bioanalysis: Reliability and Challenges" Chem. Rev. 2018, 118, 4946-4980.
Aramendia, J., "Can Raman spectroscopy determine the presence of ionic compounds? The use of water molecules as a indirect identification parameter", EPSC Abstracts vol. 16, EPSC2022-1046, 202 Europlanet Science Congress 2022.
English translation of JP2007218866A (Year: 2007).
Angus et al., "Raman spectroscopy chemistry libre text", Department of Education and University of California at Davis (Year: 2022).
Ondavia, "Monoethanolamine (MEA) Analysis Cartridge," available at https://www.ondavia.com/monoethanolamine, accessed Jul. 2017, 1 page.
Stiles, P. L., et al., "Surface-enhanced Raman spectroscopy." Annu. Rev. Anal. Chem. 1: 601-626 (2008).
Benhabib, M., et al., "Surface-Enhanced Raman Spectroscopy for Rapid and Cost-Effective Quantification of Amines in Sour Water". Abu Dhabi International Petroleum Exhibition and Conference, Society of Petroleum Engineers, Nov. 9-12, pp. 1-6, 2015.

(56) References Cited

OTHER PUBLICATIONS

Kleinman, S. L., et al. "Rapid Quantification of 4,4'-Methylenedianiline by Surface-Enhanced Raman Spectroscopy", Analytical Chemistry 89(24), Nov. 2017.
Langer, J., et al., "Present and future of surface-enhanced Raman scattering." ACS Nano 2020, 14(1): 28-117.
Kleinman, S. L. et al., "Creating, characterizing, and controlling chemistry with SERS hot spots." Physical Chemistry Chemical Physics 15(1): 21-36, (2013).
Friedman, J. H. "Multivariate adaptive regression splines." The annals of statistics: 1-67 (1991).
Kleinman, S. L., B. Sharma, M. G. Blaber, A.-I. Henry, N. Valley, R. G. Freeman, M. J. Natan, G. C. Schatz and R. P. Van Duyne (2013). "Structure enhancement factor relationships in single gold nanoantennas by surface-enhanced Raman excitation spectroscopy." Journal of the American Chemical Society 135(1): 301-308.
Cooper, J. B., M. Abdelkader and K. L. Wise, "Sequentially shifted excitation Raman spectroscopy: novel algorithm and instrumentation for fluorescence-free Raman spectroscopy in spectral space." Applied spectroscopy 67(8): 973-984 (2013).
Bu and Lee, "Optical Properties of Dopamine Molecules with Silver Nanoparticles as Surface-Enhanced Raman Scattering (SERS) Substrates at Different pH Conditions," Journal of Nanoscience and Nanotechnology, Sep. 2013, vol. 13(9), pp. 5992-5996.
Kumar, S., K. S. Gandhi and R. Kumar (2007). "Modeling of Formation of Gold Nanoparticles by Citrate Method." Industrial & Engineering Chemistry Research 46(10): 3128-3136.

U.S. Appl. No. 16/975,305, Office Action dated Dec. 30, 2022.
U.S. Appl. No. 17/527,828, Office Action dated Dec. 13, 2022.
U.S. Appl. No. 16/975,305, Final Office Action dated Apr. 20, 2023.
Canadian Patent Application No. 3,036,790, Office Action dated Mar. 21, 2023.
Japanese Patent Application No. 2021-500012, Written Opinion dated May 25, 2023.
U.S. Appl. No. 16/975,305, Office Action dated Apr. 26, 2022.
U.S. Appl. No. 17/527,844, Office Action dated Dec. 13, 2022.
European Patent Application No. 16847409.6, Communication pursuant to Article 94(3) EPC dated Jul. 15, 2021.
European Patent Application No. 19768679.3, Extended European Search Report dated Oct. 14, 2021.
U.S. Appl. No. 16/298,362, Notice of Allowance dated Mar. 11, 2021.
U.S. Appl. No. 16/280,651, Office Action dated Aug. 17, 2021.
European Patent Application No. 19768679.3, Office Action dated Jun. 23, 2023.
European Patent Application No. 16847409.6, Office Action dated Jun. 6, 2023.
Japanese Patent Application No. 2021-500012, Office Acton dated Aug. 22, 2023.
Japanese Patent Application No. 2021-500012, Office Acton dated Dec. 9, 2022.
U.S. Appl. No. 17/118,482, Notice of Allowance dated Apr. 28, 2022.
U.S. Appl. No. 17/118,482, Non-Final Office Action dated Jan. 28, 2022.

* cited by examiner

ANALYTE QUANTITATION USING RAMAN SPECTROSCOPY

RELATED APPLICATIONS

This application claims the benefit of, and priority to, U.S. provisional patent application No. 63/169,504, filed on Apr. 1, 2021, which is incorporated herein by reference.

FIELD

The present invention relates to detecting and measuring the composition of a fluid for example by using surface-enhanced Raman spectroscopy for determine the concentration of one or more analytes in water.

BACKGROUND

Quantitative chemical analysis is a fundamental, enabling technology upon which society depends. The ability to measure the composition of a fluid is relied upon across diverse industries including pharmaceuticals, food & beverage, drinking water, environmental monitoring, chemical production, and oil & gas. Not only is it useful to determine the constituents of a chemical mixture, but also to quantify the components.

The process for quantitative chemical analysis requires an analytical method or instrument that converts the amount of a chemical constituent into a measureable property; for example, optical properties such as color or spectrum; or a change in physical properties such as conductivity, density, mass, boiling point, or solubility.

The concentration of the unknown chemical component may be determined by comparison of measured properties of a sample against measured properties of laboratory-prepared chemical mixtures containing known amounts of the component. These laboratory standards are prepared and analyzed to generate a map between the measureable property of the compound and the concentration of the compound. This map, or calibration curve, provides the mathematical relationship by which an unknown concentration can be determined from a measured property of a sample.

One example of the application of analytical chemistry is in the measurement of amines in solution. Amines are used in crude oil production, natural gas recovery, and hydrocarbon refining as hydrogen sulfide scavengers, corrosion inhibitors, and pH control neutralizers. Upstream chemical treatment with compounds such as MEA-triazine, a commonly used hydrogen sulfide scavenger for oil and gas applications, generate residual amine in the hydrocarbon stream.

These residual "tramp" amines can be detrimental to the refining process. These chemical constituents of the crude oil affect the refining process, becoming heat-stable salts that form corrosive deposits that can be especially problematic for refineries handling heavy, sour crudes.

Water recycling in the refinery is another challenge for amine management. Under acidic conditions amines partition into the desalter water. If the pH at the desalter rises, the amines transfer back to the crude. This process is a vector for amines into downstream reservoirs such as the crude overhead. The reuse of water throughout the refinery can increase the amine concentration with each cycle, providing positive feedback and amplifying the problem.

The desalter is a major source of refinery wastewater. In the desalter, amines washed from the crude appear in the wastewater stream. Further exacerbating the problem, leakage from upstream processes like an amine unit also contributes significant amine content to the wastewater treatment plant. Compounds such as monoethanolamine, methylamine, dimethylethanolamine, and methyldiethanolamine all appear in refinery wastewater. These amines, in turn, lead to nitrification of the wastewater treatment system, upsetting wastewater treatment system performance.

The presence of amines in refinery process streams poses an opportunity for rapid, simple, and accurate amine analysis. The usual approach for amine analysis is ion chromatography. At lower pH, amines are cationic and can be separated in a properly chosen column. This approach requires maintenance, frequent re-calibration, and significant reagent volumes. If a high-concentration unknown sample is introduced to the system, it can lead to extensive cleaning procedures to flush excess amine from the column. Instrument downtime is expensive and risky, requiring laboratories to maintain multiple chromatographs for back-up.

Hydrogen sulfide is a naturally-occurring, poisonous, corrosive, and putrid component of natural gas and crude oil. To avoid corrosion and asset risk, it is beneficial and often legally necessary to remove $H_2S$ as early as possible before the fuel products are transported or processed. The sulfur content of crude oil supplies has increased steadily, making $H_2S$ treatment increasingly necessary. Many $H_2S$ treatment methods have been developed for use at the well-head, in transit, or within specialty scrubbing units at the refinery.

There are regenerative and non-regenerative hydrogen sulfide-capturing chemicals, each with different strengths and weaknesses. Regenerative chemicals, such as monoethanolamine (MEA), have the benefit of sulfur recovery for further use, albeit at the cost of larger capital expenditure. Non-regenerative scavengers are more cost-effective if the $H_2S$ concentration is below a few hundred parts-per-million (ppm).

One commonly-used, non-regenerative scavenger, 1,3,5-tri-(2-hydroxyethyl)-hexahydro-s-triazine (MEA-triazine, illustrated in FIG. 7, inset), is typically supplied as an aqueous solution in a range of 20- to 80% by mass. It reacts with hydrogen sulfide and is consumed in the process. One mole of MEA-triazine reacts with two moles of hydrogen sulfide, creating 2-(1,3,5-dithiazinan-5-yl)ethanol (MEA-dithiazine) and two moles of free monoethanolamine (MEA) as primary reaction products. Triazine can scavenge and incorporate other mercaptans present in the fuel stream; however, the concentration of these contaminants is minimal compared to hydrogen sulfide.

MEA-triazine is produced by mixing equal molar concentrations of MEA with formaldehyde. Three moles of each compound are consumed, producing one mole of MEA-triazine and three moles of water. The reaction is exothermic and energetically favored, quickly consuming the reactants. If produced using pure MEA and paraformaldehyde, this reaction can theoretically produce a solution that is 80.2% by mass MEA-triazine. More commonly, a concentrated solution of 50% formaldehyde (delivered in a heated tank) is mixed with MEA to produce a 60% by mass solution. Given the variables in acquiring and handling concentrated formaldehyde, along with potential negative effects on the product if the reaction becomes too hot, monitoring of the reaction is essential.

There are a few monitoring technologies to determine the concentration of triazine-based scavengers. Measuring total amine content via the Kjeldahl method can give an approximation of remaining triazine in solution; however, the process involves multiple steps including digestion, distillation, and titration as well as a priori knowledge of the amine structure. Furthermore, the presence of free or complexed MEA molecules can obscure the true value and complicate the procedure. GC-MS is complicated by the fact that MEA-triazine and its reaction products are not stable throughout the analysis process. MEA-triazine hydrolyzes rapidly in aqueous solution below pH 9. Therefore, these molecules must be derivatized before measurement, lengthening the analysis protocol and introducing a dependence on the intermediate chemical transformation in a variety of background solvents and potential interfering compounds. Proton NMR has been used to study the reaction dynamics of laboratory-scale triazine reactions but this type of study is only useful for developing models for the reaction and its products. Field asymmetric ion mobility spectroscopy has been demonstrated to analyze triazine solutions in the ppm-range but this process can be difficult to accomplish, evidenced by its lack of widespread adoption in the industry. All of the aforementioned methods require one or more of the following: costly lab equipment, skilled scientists, or difficult interpretation for industrial operators.

Current methods of analyte detection, including ion coupled plasma/mass spectrometry (ICP-MS), liquid chromatography/mass spectrometry, gas chromatography/mass spectrometry and colorimetric testing, involve expensive and lengthy sample preparation with highly complex instruments, poor sensitivity, and/or an inability to detect trace and ultra-trace compounds among other ions and interferences.

INTRODUCTION TO THE INVENTION

Spectroscopic methods are useful for chemical analysis due to their rapid analysis time, non-destructive sampling, and robustness. Raman scattering has been observed for nearly one-hundred years, with well-documented application to industrial process control. Raman spectroscopy is analogous to infrared spectroscopy in that it monitors the vibrations of chemical bonds. Each set or combination of bonds has a distinct spectrum, providing a chemical 'fingerprint' which uniquely identifies the unknown chemical.

The un-aided Raman scattering interaction is a low-probability event, requiring either high laser power or high analyte concentrations. However, Raman spectroscopy can be amplified by the use of noble metal nanoparticles. These nanoparticles act as antennae, increasing the efficiency of Raman scattering by three to nine orders of magnitude. This signal enhancement allows detection of a wide variety of molecules down to trace concentrations (Stiles, Dieringer et al. 2008, Benhabib, Tran et al. 2015, Kleinman, Peterman et al. 2017, Langer, Jimenez de Aberasturi et al. 2019). Coined surface-enhanced Raman spectroscopy (SERS), this effect was first discovered in the 1970's and, in some applications, may be sensitive enough to detect the vibrations of a single molecule (Jeanmaire and Van Duyne 1977, Kleinman, Frontiera et al. 2013, Kleinman, Sharma et al. 2013).

The intensity of an observed SERS spectrum is directly proportional to the concentration of compounds in a solution being tested. In the systems and methods described herein, we use this relationship coupled with an internal standard or standard additions to produce a test for quantification in aqueous solutions. When coupled with internal standards or standard additions, SERS becomes a quantitative method.

This specification describes systems, kits and methods for determining the concentration of an analyte, for example in a water sample. The systems and kits may include a Raman spectrometer and an internal standard, for example an isotopologue, or a known amount of the analyte for standards addition. The systems and kits may also include nanoparticles. In a method, an analyte in a water sample is quantified by mixing an internal standard, or an additional amount of the analyte, with the water sample. Nanoparticles are also added. The sample is analyzed with a Raman spectrometer. The analysis may include mapping data (i.e. some or all of a measured spectrum) from the Raman spectrometer to the quantity of the analyte. The mapping can include using a calibration curve, for example a multivariate calibration curve. The calibration curve may be developed using samples prepared with known concentrations of both the analyte and the internal standard. Optionally, the calibration curve is prepared using the same concentration of the internal standard as is added to the water sample. Optionally, the calibration curve may be prepared using one or more data manipulations that are also used while testing the water sample.

In an example, surface-enhanced Raman spectroscopy (SERS) is used to determine the concentration of an amine, for example a tramp amine such as monoethanolamine or methylamine. Optionally, the amine may be present in a refinery process water sample. The method includes using an internal standard and a calibration curve. The method optionally includes solid-phase extraction (SPE) or other pre-treatment of the sample. The internal standard may be an isotope of an amine, optionally an isotope of the analyte amine. The calibration curve may be prepared using samples having a known concentration of the analyte and the internal standard.

In an example, this specification describes a process to quantify MEA-triazine concentration using Raman spectroscopy. This process may be used to control chemical dosage during an industrial process, for example manufacturing or gas sweetening. The method may be used to measure triazine concentrations ranging from 30 to 80% by mass. Optionally, the method includes quantification of one or more residual reactants.

In other examples, this specification describes the quantification of metals in aqueous solution using SERS and one or more of colorimetry, internal standards and standard additions.

BRIEF DESCRIPTION OF THE FIGURES

The objectives and advantages of the present invention will be understood by reading the following detailed description in conjunction with the figures, which are briefly described below.

DETAILED DESCRIPTION

Figure 1:
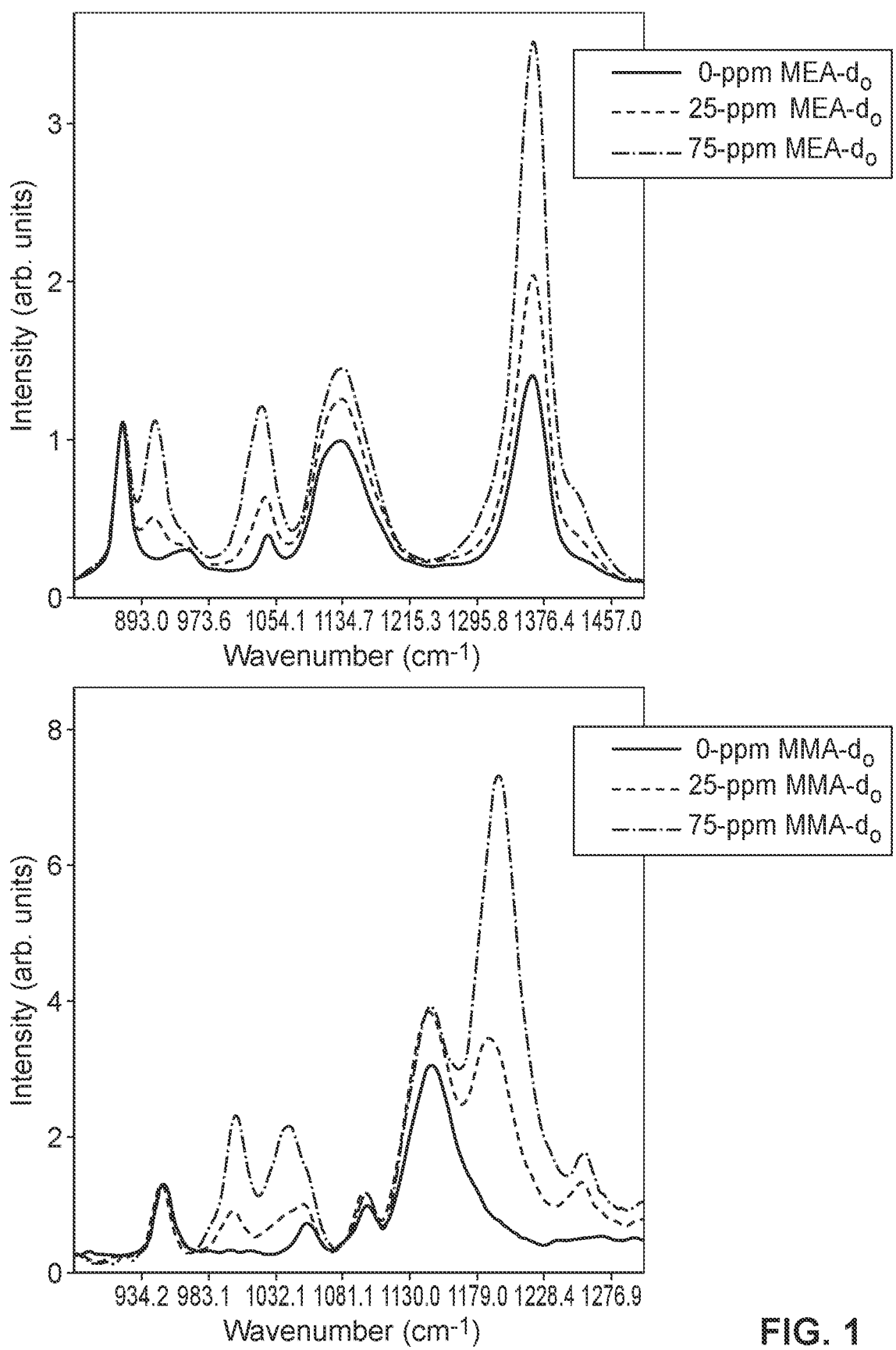
FIG. 1 shows Raman spectra for mixtures of amines and isotopologue internal standards: (top panel) 50-ppm MEA-$d_4$ with 0-, 25-, and 75-ppm MEA-$d_0$; (bottom panel) 50-ppm MMA-$d_3$ with 0-, 25-, and 75-ppm MMA-$d_0$.

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The process of performing quantitative chemical analysis requires first mapping the concentration of a chemical constituent (i.e. an analyte of interest) against a measureable physical property. One such optical property is the Raman effect, where the intensity of the response is directly proportional to the number of molecules, and therefore a direct measure of the concentration. The process of generating a Raman calibration curve includes preparing multiple solutions of the chemical constituent at different known concentrations and collecting Raman spectra of the resulting solutions.

But the collection of Raman spectra alone is not sufficient for quantitative analysis; the spectra must be processed to generate the calibration curve. The Raman spectrum contains an array of data points representing the signal intensity at a set of wavelengths. A typical Raman spectrum might have a few hundred pixels, each providing an intensity data point at a wavelength in the spectrum. Therefore, a calibration curve might map one (univariate) or more (multivariate) locations in the spectrum to concentration; and the mapping function can be simple (linear, polynomial, logarithmic) or highly complex (neural network or other machine learning techniques).

Internal Standard Addition and Data Preparation

Although techniques for creating a calibration curve are well-understood across analytical chemistry, in the Raman spectroscopy field, calibration curves are typically considered impermanent. They must be tested and replaced on a routine basis. The measured Raman signal is dependent on environmental changes and variations. For example, changes in the optical system can cause variations in the signal intensity which leads directly to errors in the measurement. A change in focus or a dirty optical component will change the measured intensity, which will be interpreted as a change in concentration. A change in chemical composition, such as the introduction of an interfering constituent, will also change the measured intensity. Therefore, calibration curves must be tested and verified on a routine basis—and updated or replaced if the accuracy is not sufficient.

This problem is solved through the addition of an internal standard in both the creation of the calibration curve using samples of known concentration of analyte, and the subsequent measurement in the field of a sample containing an unknown concentration of analyte. An internal standard is a material of known spectrum and known concentration that is introduced to the sample. As an example, an isotopologue of the target analyte, or an isotopologue of a compound similar to the target analyte, makes for an excellent internal standard. For example, where the analyte is an amine, the internal standard may be an isotopologue of the same amine, an amine with the same number of substituents, or another amine. The signal from the internal standard provides a reference point against which environmental and experimental variations can be identified and eliminated. The addition of an internal standard provides a significant improvement to data analysis for all optical methods including Raman spectroscopy.

This improvement is especially evident when dealing with SERS. The increase in signal strength can be many orders of magnitude, such that a small error is amplified many times. The seemingly stochastic nature of SERS hot spots has prevented widespread deployment as an analytical technique. However, an internal standard eliminates many of the variables, resulting in a robust analytical technique.

The general framework for preparing a sample for analysis is to first mix an internal standard into the sample at a known concentration of the internal standard. Providing the internal standard early in the process allows for sample processing, such as filtration, heating, or chemical reactions, where analyte concentrations might change. The sample can then be filtered or modified in some manner to improve the response for the analyte under study. Additional materials are then added to enhance the Raman spectra, as needed, such as metallic nanoparticles. When using a 785-nm laser in a Raman spectrometer, 85-nm gold nanoparticles strongly enhance the Raman spectra, but particles of various metals and sizes are all useful for signal enhancement.

The mixed sample is then introduced into a Raman spectrometer and one or more spectra are collected or measured. One or more additional "dark" spectra are also collected without laser excitation. A dark spectrum samples the background optical environment. One dark spectrum may be collected if the background does not change. Many dark spectra may be collected if there is an expectation that background conditions may change.

During analysis, the measured spectrum may be prepared by making one or more adjustments to it. In one adjustment, the dark spectrum is subtracted from the Raman spectrum. Generally, the subtraction is linear—pixel-by-pixel or wavelength-by-wavelength; however, it is occasionally preferable to subtract spectra using a minimization technique. In another adjustment, the measured spectrum is smoothed, optionally after subtraction, such as by using a moving average or a Savitsky-Golay algorithm.

In another adjustment, the measured spectrum is analyzed for one or more known peaks specific to the internal standard. As the internal standard is a known material with a known spectrum, these peaks are at known wavelengths. A failure to identify a signal corresponding to the internal standard is a flag that the sample was prepared improperly, which helps eliminate false negatives. If the internal standard is not present in the measured spectrum, the unknown analyte may not be visible, which could be falsely interpreted as the analyte not being present.

If the measured spectrum appears misaligned with the expected signal for a sample including the internal standard, it can indicate an error in spectrometer calibration. The measured spectrum can be shifted to have one or more peaks at wavelengths expected for the internal standard. This shifting compensates for small variations in system calibration, an important benefit of an internal standard. For small offsets, this shift can be done linearly or quadratically; for larger offsets, a new spectrometer calibration (mapping of pixel to wavelength) can be performed using the internal standard spectrum.

After the measured spectrum is prepared for analysis, for example by one or more of smoothing, shifting and background-subtraction, the spectrum is then scaled to a characteristic internal standard peak, i.e. a peak expected for the internal standard but not expected for the analyte alone. This scaling is performed by first determining a scaling parameter, for example the intensity or area of a characteristic internal standard peak. The spectrum is divided by this parameter.

Once the measured spectrum is scaled, the concentration of an unknown analyte in the sample can be determined using a calibration curve. This curve is determined using a series of samples prepared with known concentrations of an analyte under study. Each sample is typically prepared identically, but with a different concentration of the analyte, and spectra are collected. Each sample also contains a known concentration of the internal standard. This series of spectra is optionally collected over a concentration range of the analyte in which the internal standard concentration is near, for example within 25% of, the midpoint of a target analyte concentration range. For example, if the target range of analysis is 0- to 100-ppm of analyte, the internal standard might be provided at 25-75 ppm, or about 50-ppm. If multiple analytes are expected in a sample, this approach is repeated for each analyte.

During analysis of unknown samples, it is preferable that the sample be prepared in substantially the same manner as the calibration curve samples. Optionally, addition of the internal standard, and any other sample preparation steps, may be repeated at the same concentrations, volumes, etc. for optimal analysis.

If the internal standard is introduced in a field sample at a different concentration than the concentration of internal standard used to prepare the calibration curve, the result from the calibration curve will differ from the expected value. Because the data is scaled to the internal standard signal, the measurement result can often be adjusted to correct for the different internal standard concentration; however, additional calculations are necessary. For example, if the internal standard concentration used to measure a water sample in the field is half the value that was used while creating the calibration curve, the resulting measurement will be twice the actual value. However, such adjustments may result in a less accurate measurement. More accurate measurements are achieved when the internal standard is introduced in a field sample at the same concentration of internal standard that was used to prepare the calibration curve. Further increases in accuracy can be achieved by using the same volume of internal standard solution and the same volume of analyte solution, and even that same materials handling procedures (i.e. same size, shape and material of containers, same pipettes or other transfer devices, same Raman instrument and associated trays or cartridges, same order of operations), between a measurement in the field and the creation of the calibration curve in a laboratory.

Optionally, spectra obtained during the creation of the calibration curve are prepared, for example smoothed, shifted, background-subtracted and/or scaled, in the same manner that samples of unknown concentration measured in in the field are prepared.

Multivariate Analyte Quantification

Spectra are processed through the method described above, resulting in a mapping of intensity at one or more wavelengths measured in the field to concentration by way of a calibration curve. With a simple spectrum containing at least one characteristic internal standard Raman peak and at least one identifiable analyte Raman peak (which may also be a peak for the internal standard), a linear or polynomial mapping of a single value (for example the intensity or area of a single analyte peak scaled to the intensity or area of a single characteristic internal standard peak) might be sufficient to create a calibration curve (when the single value is determined for each of a set of known analyte concentrations) and then to determine analyte concentration from a spectrum measured in the field.

However, a Raman spectrum typically contains many peaks, all of which provide information about the concentration of the constituent components. Therefore, a multivariate calibration curve is optionally used. In this approach, numerical techniques that consider multiple locations in the spectrum, up to the entire spectrum, are used. Since more than one location in the spectrum is considered, the resulting calibration curve variation depends on multiple spectral locations (wavelengths)—i.e., it is multivariate. Example algorithms are a multivariate adaptive regressive splines or partial least squares techniques that reduce the spectral vector to a scalar concentration value.

Iterative Multi-Analyte Quantification

An alternative to performing a multivariate analysis directly on the spectrum is to subtract expected spectra serially. The addition of an internal standard makes this process possible. Without an internal standard to scale the spectrum, the scaling coefficient would not provide a consistent measure of concentration.

The method starts with an array of spectra from expected constituents. A sample spectrum is smoothed and scaled in preparation for analysis. Then, each spectrum is compared against this sample spectrum, scaled to match, and subtracted from the sample spectrum. The scaling coefficient is a measure of the constituent concentration. This process proceeds iteratively until all constituents are measured.

The preferred subtraction method is a minimization method, with the minimization coefficient recorded for each constituent.

$$\frac{\partial}{\partial k}(S - \lambda B) = 0$$

The minimization coefficient, $\lambda$, is a measure of how much of each material is present in the sample. The spectrum to subtract is B, while the Raman data is S.

As an example for monoethanolamine analysis, this approach would start by first subtracting a spectrum of the internal standard signal. If the minimization coefficient is low, then the sample was prepared improperly and the user is alerted to the error. Next, the spectra for various interfering amines are subtracted from the spectrum. For monoethanolamine, these amines can include dimethylethanolamine, methylamine, and 3-methoxypropylamine. Finally, the spectrum for the analyte of interest is subtracted.

The minimization coefficients for the internal standard and the analyte of interest are used to determine the concentration of the unknown analyte. For example, the ratio of the coefficients may be fit to a polynomial that matches signal to concentration. Furthermore, the coefficients for the interfering compounds can be compared to the internal standard to determine their concentrations.

Spectral Internal Standard Controlled Shifting

A typical real-world Raman spectrum consists of two signal sources: the pure Raman spectrum and artifacts due to fluorescence and spectrometer manufacturing imperfections. These latter signals are invariant of the excitation wavelength for small changes in excitation. Meanwhile, the Raman spectrum shifts with changes in excitation wavelength.

Using this property, it is possible to derive the two signal sources by collecting multiple spectra with small shifts in excitation wavelength. These shifts can be performed by using an array of lasers or by adjusting the temperature of a single laser.

The set of collected data may be defined as a matrix, R, which contains K columns and N rows. The index K is the number of collected spectra and the index N is the number of points in each spectrum. We may also define a vector S composed of the Raman variant ($S^V$) and invariant ($S^I$) signals. The vector S contains 2N items:

$$S=(S^V, S^I)^T$$

where T means the transpose.

The relationship between the collected data R and the desired information S is:

$$R=HS$$

The matrix H is determined by the shift distance for each spectrum. This equation may be solved for S by various methods, including matrix inversion, iterative approaches, or decomposition.

Previous methods that rely upon this approach require knowing the excitation wavelengths and/or shifts a priori so that the inverse of H can be pre-calculated or to simplify iterative methods (Cooper, Abdelkader et al. 2013). The introduction of an internal standard eliminates the need for pre-defining any properties, as a peak in the internal standard Raman spectrum can be used to determine the shifting distance.

In this embodiment, a sample is mixed with an internal standard of known concentration and spectrum. For example, in the analysis of monoethanolamine, monoethanolamine-$d_4$, which has a strong Raman band at ~870-cm$^{-1}$ that is distinct from the non-deuterated version of monoethanolamine, is a useful internal standard. However, other isotopologues, such as monoethanolamine-$^{13}C_2$ may be more practical in real-world applications.

The mixed sample is then introduced to the Raman spectrometer and a spectrum collected. The laser temperature is adjusted by any amount that results in an observable shift in the Raman spectrum. A second spectrum is collected. This process is repeated until an acceptable number of spectra are collected, with a minimum of two spectra and a maximum within the operating temperature range of the laser before performance degrades. The collection of more spectra results in improved signal-to-noise.

Once the spectra are collected, the wavelength shift is calculated by comparing the location of the internal standard peak. The difference in peak location is the shift. Once the shifts are known, the Raman variant and invariant spectra may be obtained. The Raman variant spectrum can then be analyzed for concentration using any of the techniques described above.

Standard Addition as Internal Standard

Although an internal standard provides a wide-range of benefits, an appropriate material is not always convenient. An alternative approach to quantitation is via standard additions. This method effectively uses the analyte under study as an internal standard. The presence of and change in the expected peaks on addition of known amounts of analyte helps eliminate false negatives while providing peaks that may be used for further analysis.

For example, measuring lead in drinking water will inevitably involve other interferences in the solution. To account for the presence of other ions, standard additions can be used as a quantitative analysis approach. This method of analysis involves adding known amounts of lead to aliquots of prepared sample. Each aliquot of the "sample" is spiked with a chosen set of these standard concentrations of $Pb^{2+}$ and signal is subsequently measured. By attaining a linear relationship through comparison of these spiked samples, we can extrapolate to zero signal, and determine the unknown concentration.

In-Process Detection Limit Determination

The presence of an internal standard signal also enables real-time determination of the limit of detection for each sample. Sample-to-sample variations lead to changes in the overall signal strength. The height of the internal standard signal with respect to the sample noise provides a measure of the detection limit.

In simplest terms, the limit of detection is three times the noise. The detection limit is often determined by first generating a calibration curve and then measuring multiple samples that contain no analyte under study. The measurement of the samples passed through the calibration curve results in an average and a standard deviation. The limit of detection is the average plus three times the standard deviation.

When coupled with an internal standard, a similar analysis can be performed. The Raman spectra contains information about both the noise and the signal, which enables a limit of detection calculation on every sample. First, the spectra are processed according to the methods described above (shift, smooth, scale). Then, take a region of the spectrum that contains no peaks or signal, and measure the standard deviation over a region. This measurement determines the scaled spectrometer noise relative to the internal standard signal. By processing three times this value through the calibration curve, we obtain an estimate of the limit of detection for the spectrum.

EXAMPLE 1

Quantification of Amines in Refinery Process Water

Gold colloids were created using the citrate reduction method (Kumar, Gandhi et al. 2007) starting with $HAuCl_4$ (CAS 06903-35-8) from Salt Lake Metals (Salt Lake City, UT) and sodium citrate dihydrate from Fisher Scientific (Pittsburgh, PA). Briefly, 250 mL Milli-Q water and 1.257 g 1% $HAuCl_4$ solution were brought to a rolling boil with stirring on a hotplate. A 1.055-mL volume of citrate solution (10-mg/mL) was injected and boiled for an additional ten minutes. During this process, the solution transitioned from the clear yellow of dilute chloroauric acid to the purple-gray of colloidal gold nanoparticles. The nanoparticles are approximately 80-nm in diameter as determined from their UV/vis spectrum. Once the solution cooled to room temperature, the nanoparticles were concentrated using centrifugation to a final volume of 3 mL, providing enough material for sixty tests. This gold nanoparticle concentrate (cAuNPs) is shelf-stable and remains active in high-salinity samples.

The amine measurement starts by adding an internal standard to the sample, MEA-$d_4$ and MMA-$d_3$ for MEA and MMA measurements, respectively. Each isotopologue is prepared at mid-measurement-range, in this case 50-ppm, and mixed with the sample at equal volumes. The sample is then adjusted to pH 12.7 using 1M NaOH. The pH-adjusted sample is mixed with cAuNPs at a volume ratio of 7:1 cAuNPs:sample and measured in the Raman spectrometer.

The Raman spectrometer is a dispersive system equipped with a 785-nm laser. The instrument measures Stokes scattering between 200 and 2000 relative wavenumbers using a thermoelectrically-cooled charge-coupled device. For these measurements, the power at the sample is about approximately 50 mW. Acquisition time was one second for SERS analysis, providing suitable signal-to-noise ratios.

The data were processed as described above: dark background subtracted, smoothed using a Savitsky-Golay algorithm, and frequency calibrated by linear spectral shifting. This process was followed by an additional background subtraction using a linear piecewise background subtraction routine. Finally, data were scaled to the intensity of the MEA-$d_4$ peak. These data were manually checked for outliers and non-conforming spectra. The resultant data set was supplied to a Multivariate Adaptive Regression Splines (Friedman 1991) algorithm to generate a mathematical relationship between the observed spectrum and a known concentration of MEA-$d_0$ in ppm. This mathematical model was used to predict concentrations of the target chemical for unknown samples. A similar process was repeated for methylamine analysis using MMA-$d_3$ as an internal standard.

Under high pH conditions, amines are Lewis bases and have a natural affinity for gold nanoparticle surfaces. By adjusting the solution pH to be 2 pH units above the amine $pK_a$, we get a strong and characteristic SERS response. We have observed strong signal from primary through quaternary amines—both cyclic and linear. We demonstrate here this effect through the detection and measurement of monoethanolamine (MEA) and methylamine (MMA).

As an internal standard, we chose isotopologues of the analyte under study. The isotopologue is structurally similar to the unknown sample, yet spectroscopically distinguishable. This enables the use of sample pre-treatment methods without varied recoveries. The deuterated versions of the analyte have similar Raman spectra and behavior during sample preparation, while having only a few spectral features shifted. By introducing a known quantity of internal standard into each sample at the start of sample preparation, we create a method that is self-calibrating.

A Raman spectrum for MEA-$d_0$ and its isotopologue, MEA-$d_4$, is presented in FIG. 1. The two materials have identical spectra except for one shifted peak: 910-$cm^{-1}$ for $d_0$ and 870-$cm^{-1}$ for $d_4$. This shift is easily resolved, even in lower-cost, portable Raman spectrometers. For monoethanolamine, the pH is adjusted to 12.7, which is approximately two pH units above the $pK_a$ for the deuterated MEA. The spectra for MMA-$d_3$ has a unique peak at 951-$cm^{-1}$, while MMA-do has a peak at 1014-$cm^{-1}$, measured at a final pH of 13.

Figure 2:
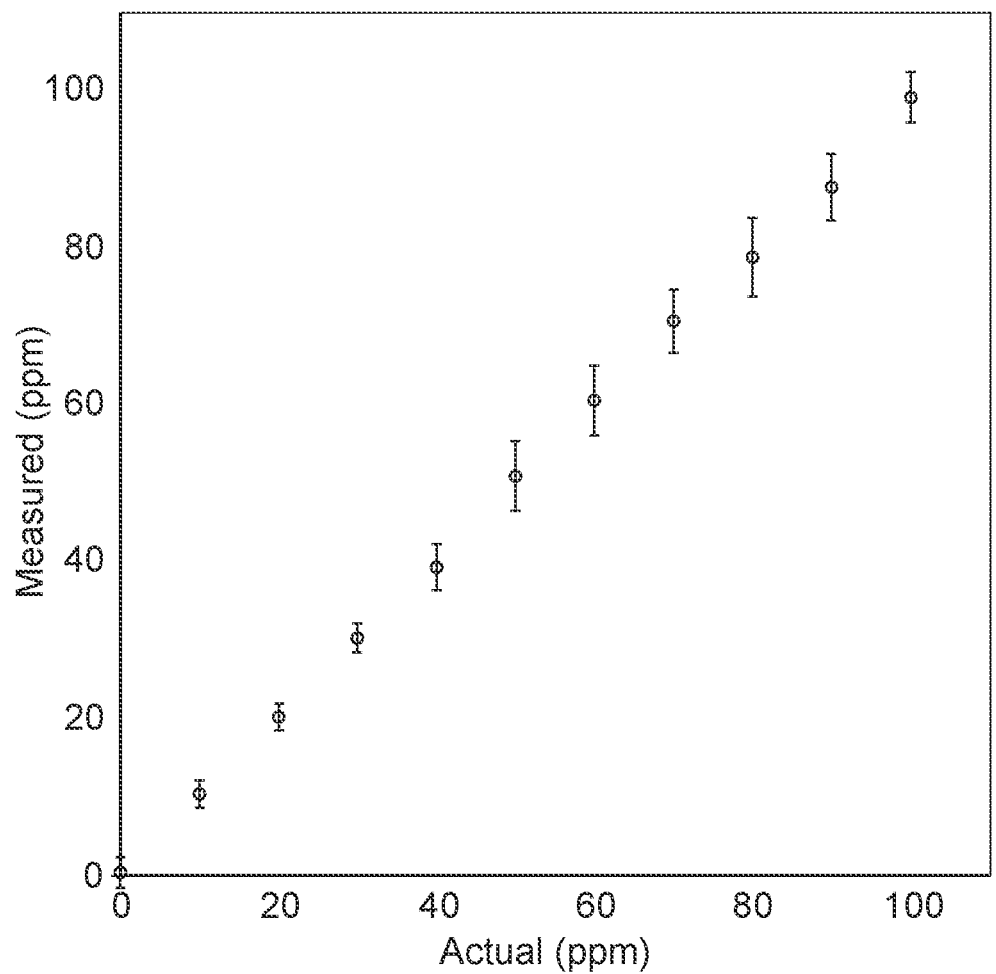
FIG. 2 shows results of measuring monoethanolamine in laboratory standard solutions using SERS and a multivariate calibration curve. The scale bars indicate standard deviation on the mean.

For quantification, the Raman spectra are baselined and scaled to the MEA-$d_4$ peak at 870-$cm^{-1}$ or the MMA-$d_3$ peak at 951-$cm^{-1}$. The introduction of a known quantity of isotopologue provides a clear signal against which all samples may be scaled and compared. A set of samples were prepared in deionized water at a range of concentrations from 0- to 100-ppm and used as training and test datasets. This data is then processed through a multivariate adaptive regressive splines algorithm (Friedman 1991). The equation generated by the multivariate algorithm directly generates the concentration of the analyte under study based on the scaled intensity of the Raman spectrum. A comparison of test data against the multivariate calculation is presented in FIG. 2.

Figure 3:
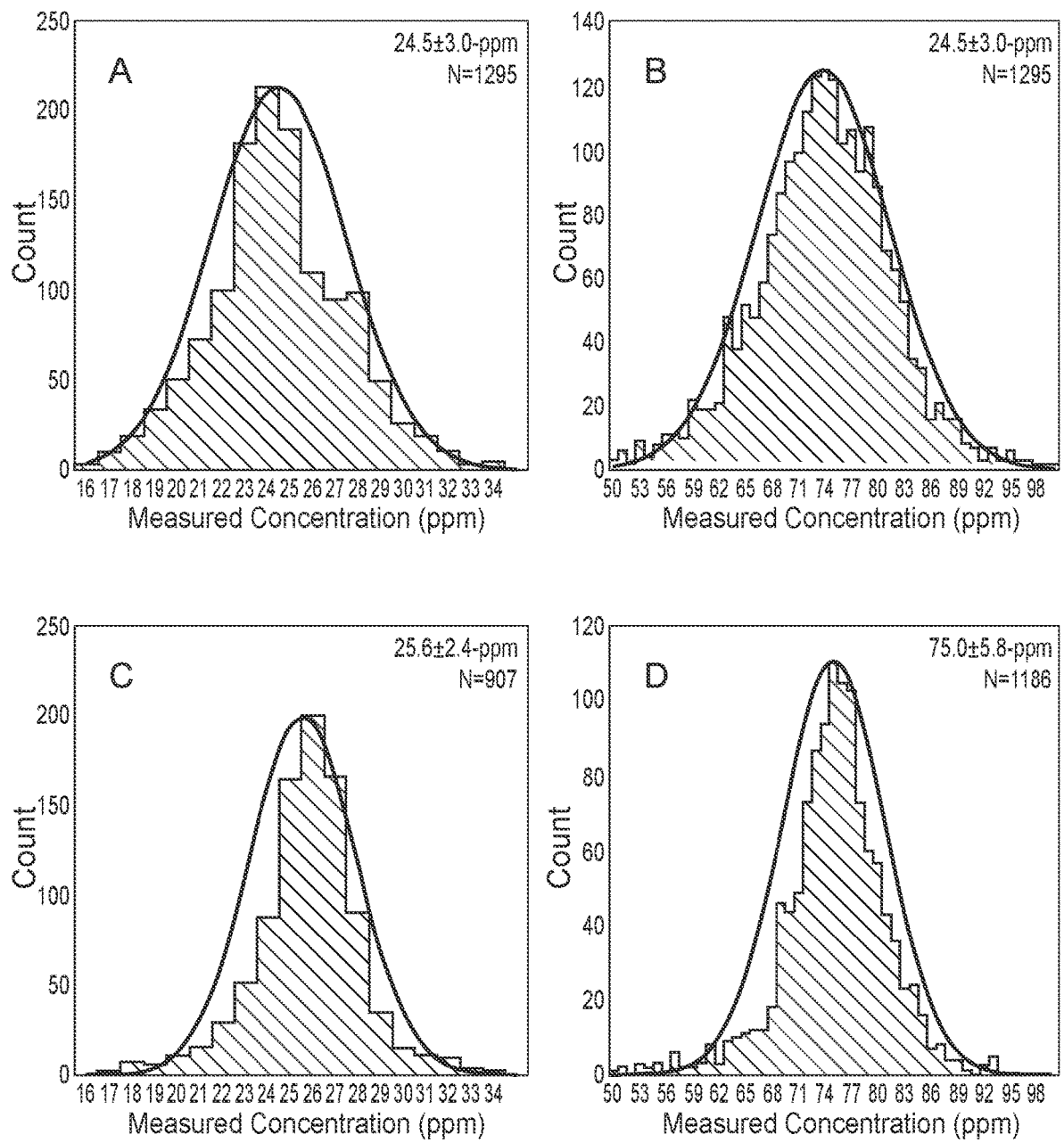
FIG. 3 shows measurement of 25- and 75-ppm laboratory standard MEA solutions (A and B) and 25- and 75-ppm laboratory standard MMA solutions (C and D). These data were collected over 4.5 years on twenty-five different Raman spectrometers. The Gaussian curve overlays illustrate the average and standard deviation of the data.

This equation is stable over time (five years), across samples (thousands), nanoparticle batches (hundreds), operators, and between spectrometers (over twenty-five) without adjustment or re-calibration. Data for MEA and MMA are presented in FIG. 3. The method rivals ion chromatography in terms of accuracy, yet is significantly faster and easier to perform. In addition, the entire dataset is based on one calibration using training data generated five years ago.

To determine the limit of detection, we performed repeat testing with a 5-ppm MEA sample. Over seven measurements, we found an average concentration of 4.5±0.2-ppm (mean±standard deviation). This result corresponds to a minimum detection limit (MDL) of 0.6-ppm using a Student's T value for six degrees of freedom (Eaton, Clesceri et al. 2005). A similar analysis for MMA results in 4.2±1.0-ppm, with an MDL of 3.2-ppm.

To this point, data was created using laboratory standards; the challenge is addressing real-world samples. When this method is applied to refinery process water samples, the result is a spectrum with few features. The nanoparticle solution rapidly changes color due to the high concentrations of destabilizing compounds causing nanoparticles to fall out of solution, resulting in a featureless spectrum. A further advantage of an internal standard is to reduce false negatives. A blank spectrum could be interpreted as a null result; however, the present of an internal standard reduces false negatives—especially an internal standard that is chemically identically to the analyte under study. A missing internal standard signal is an indication of a problem in sample preparation or matrix.

To improve measurements in field samples, we implemented an anion-exchange-based, solid-phase extraction (SPE) method to reduce sample background. The SPE column acts as a selective filter, removing species from the sample without reducing the amine concentration. By making the solution slightly acidic, we maintain the amines as cationic to ensure they pass through the capture material.

Figure 4:
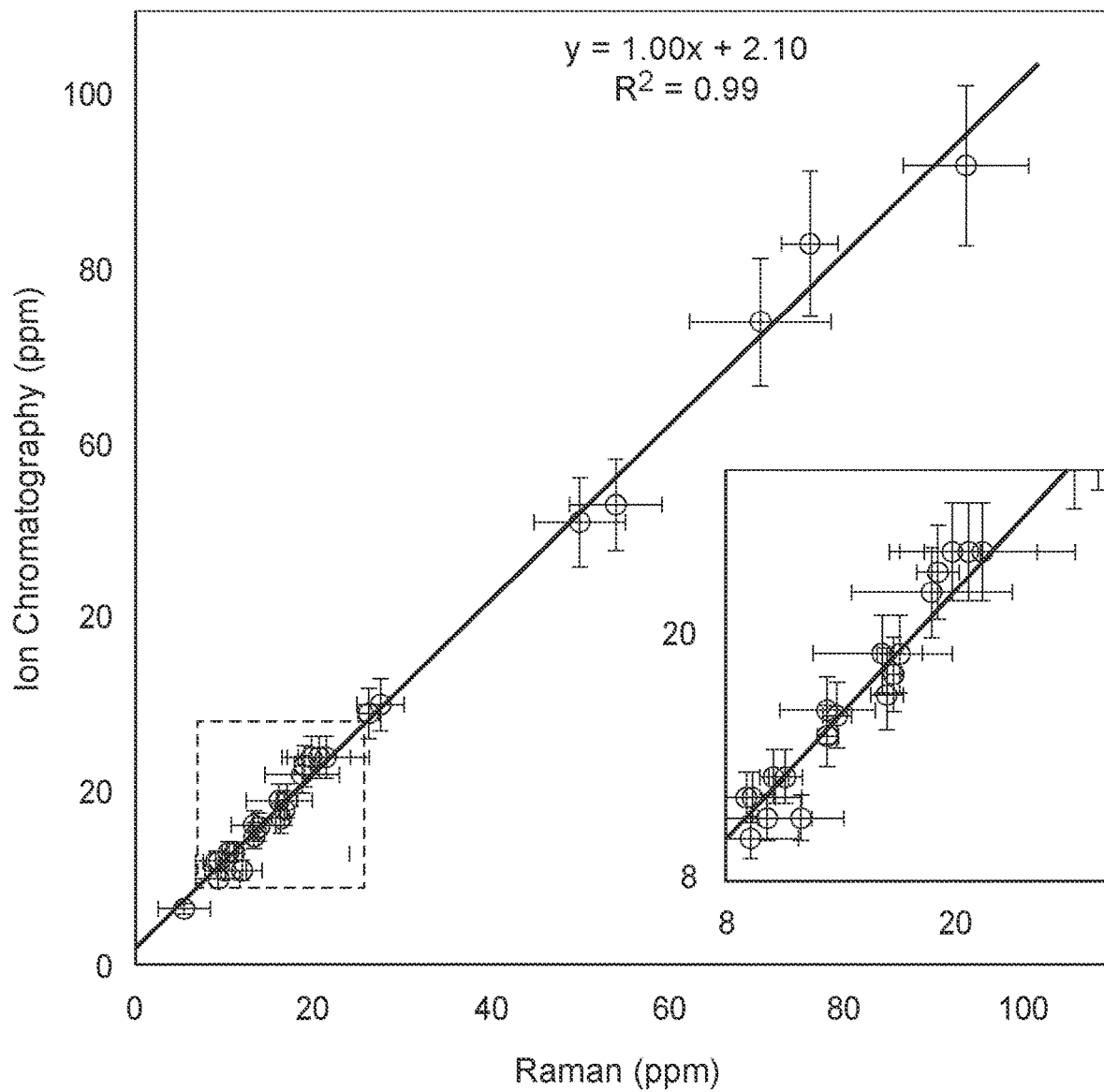
FIG. 4 shows measurement of MEA in refinery process water samples as compared to ion chromatography. The inset provides a more detailed view of the data at the low end of the range.
Figure 5:
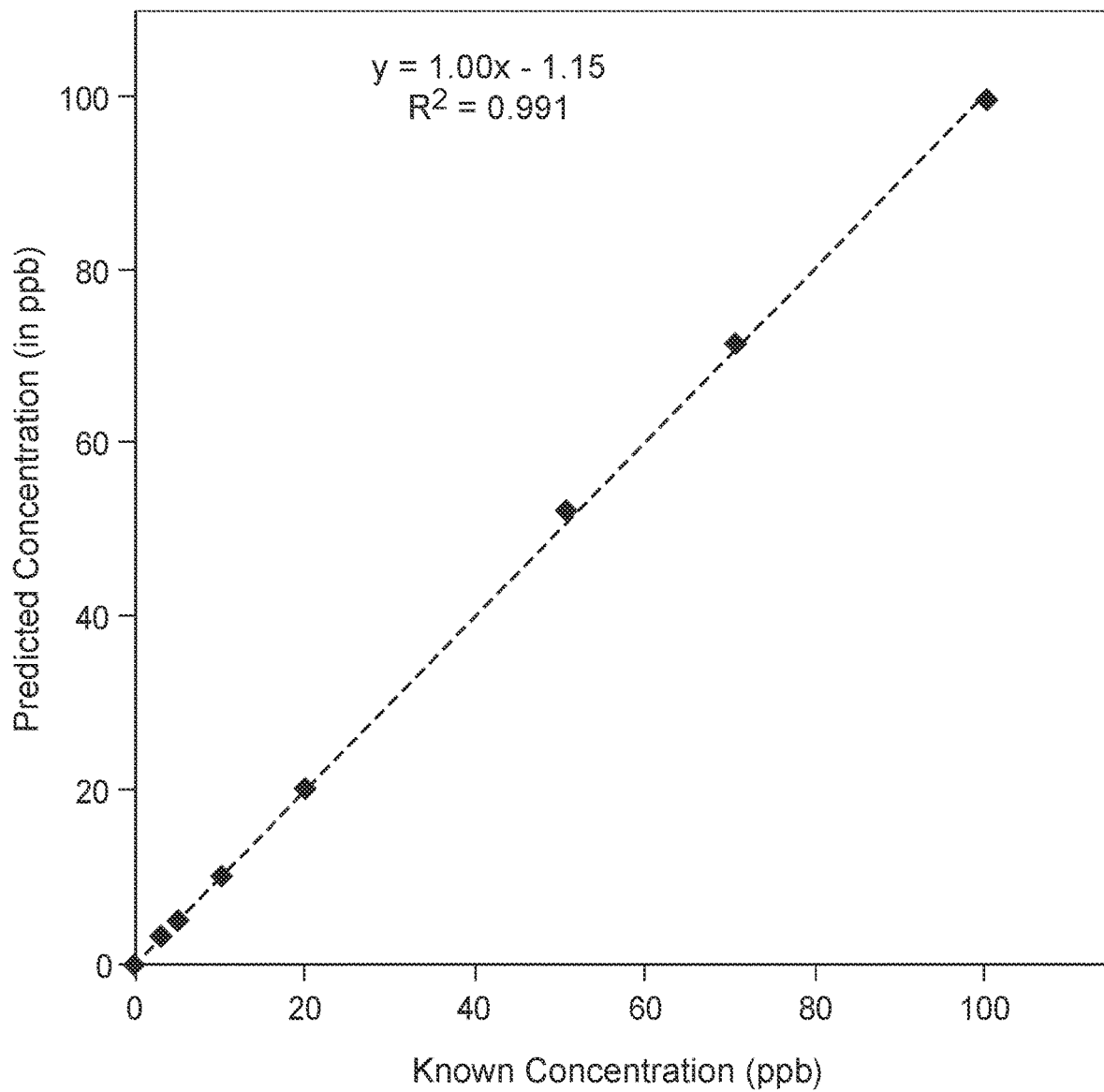
FIG. 5 shows a calibration curve for lead analysis.
Figure 6:
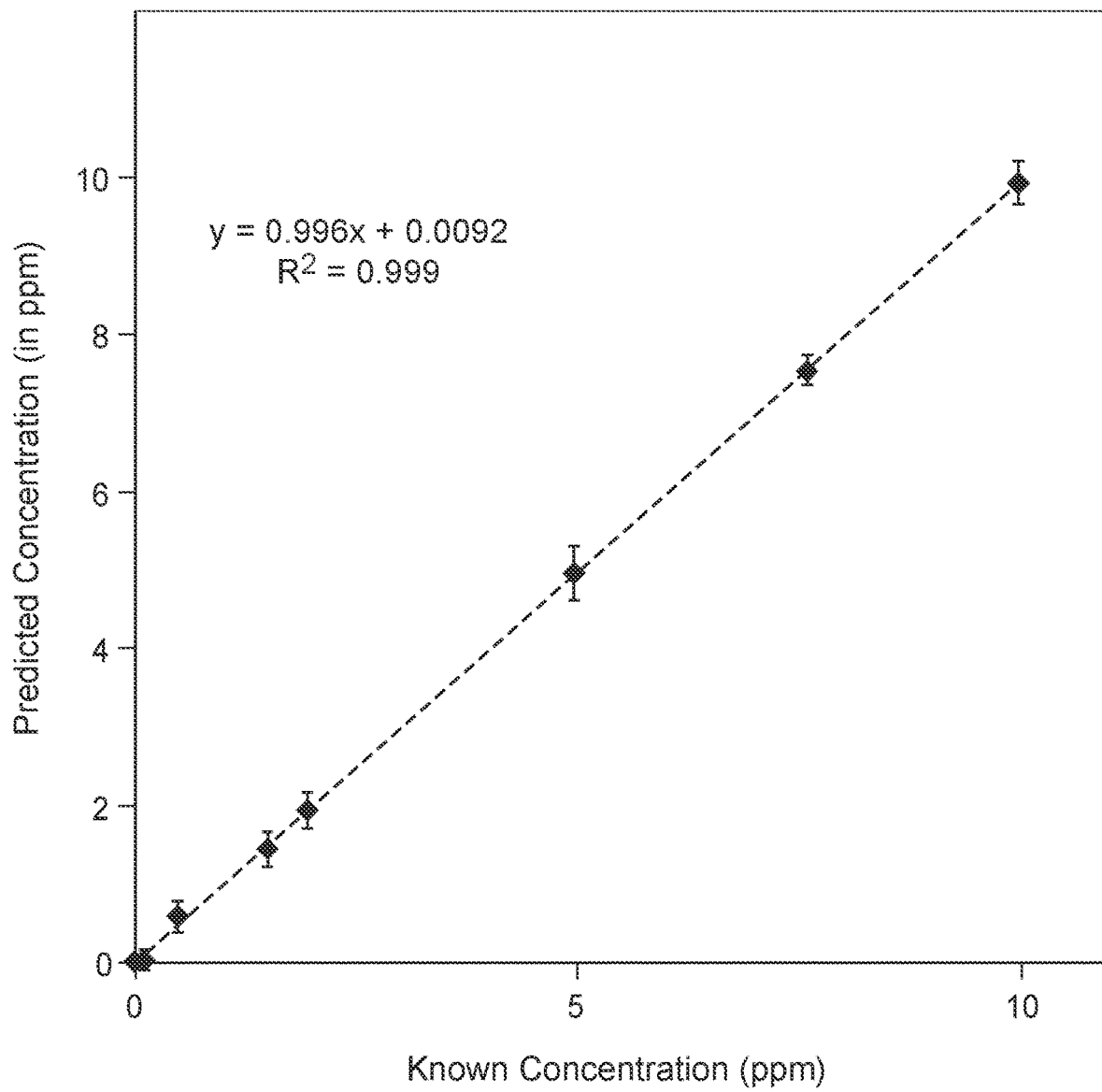
FIG. 6 shows a calibration curve for copper analysis.

We compare the Raman/SPE approach against ion chromatography in FIG. 4 for twenty-seven samples obtained from refineries across North America. The ion chromatography results are as reported by the refinery laboratory, while the Raman results were determined via three repeat measurements. Above 20-ppm, the average relative error with respect to ion chromatography is 9%; below, 20-ppm the average relative error is 13%. The increased error is expected as the amine concentration approaches the lower range of calibration. This accuracy can be improved by reducing the internal standard concentration.

EXAMPLE 2

Measuring the Concentration of Lead

In an additional embodiment of our invention, we measure the concentration of lead in water using the amine, 2-mercaptoisonicotinic acid (2-MNA) as a linker molecule. We then follow a standard addition method, mixing 900 microliters of sample with 100 microliters of six concentrations of $Pb^{2+}$ (0, 10, 50, 75, 100, 1 ppm), 1 microliter of 0.1 mg/ml 2-MNA, 40 microliters of NaCl, and 1 microliter of silver nanoparticles (AgNPs). One additional sample is prepared with sulfide added to precipitate $Pb^{2+}$, providing a true baseline signal. This mixture is allowed to react for ~10 minutes at room temperature before being tested. Five microliters of the sample-nanoparticle mix is dispensed on a plastic cartridge for measurement by the Raman spectrometer.

EXAMPLE 3

Measuring the Concentration of Copper

In a further embodiment of our invention, we measure the concentration of copper using the amine-containing-compound benzotriazole as a linker molecule with gold nanoparticles (AuNPs). Benzotriazole inhibits copper corrosion. Five microliters of benzotriazole are mixed with five microliters of a sample concentration of copper and one microliter of AuNPs. This mixture is allowed to react for ~10 minutes at room temperature before being tested. Five microliters of the sample-nanoparticle mix is dispensed on a plastic cartridge for measurement by the Raman spectrometer.

EXAMPLE 4

Measuring the Concentration of Hexavalent Chromium

Another embodiment of our invention is the measurement of hexavalent chromium in water using the amine 4-aminopyridine (4-AP) as a linker molecule with an $^{18}O$ version of chromate as the internal standard. The heavy oxygens in the isotopologue result in a spectrum distinct from naturally-occurring chromate. However, $^{18}O$ chromate is not stable in water, as the oxygen atoms will exchange with the $^{16}O$ in the solution. By storing the chromate internal standard in an $H_2^{18}O$ aqueous solution, the internal standard remains stable indefinitely and can then be used as an internal standard.

This approach demonstrates how an internal standard may need to be carefully prepared and/or stored for optimal performance. Storing an isotopologue in a form of heavy water may be necessary for stability and accuracy, and can be applied to internal standards for methanol or formaldehyde, for example. Alternatively, an internal standard may need to be chosen so that it does not isotope exchange in the solvent. For example, the $^{13}C$ versions of methanol, ethanol, formaldehyde, and acetaldehyde are stable in standard water.

EXAMPLE 5

Quantitative Analysis of Triazine-Based Hydrogen Sulfide Scavengers

MEA-triazine (CAS 4719-04-4) was purchased in high purity from Toronto Research Chemicals and dissolved in deionized water (>18.2 $M\Omega/cm^2$, Milli-Q) to create calibration solutions. We prepared MEA-triazine solutions between 10 and 90% by mass (%-wt) to use as the training data for the MEA-triazine calibration curve. These solutions were mixed with a water-soluble, Raman-active compound containing a phenyl group ("reagent") that acts as an internal standard to ensure robust and consistent Raman spectrum. Samples for triazine analysis are prepared by mixing five parts reagent solution with one part triazine solution, which dilutes the sample solution, helping homogenize the sample and reduce photo-degradation during long laser exposure.

To create calibration models for triazine measurements, we combined 500 mg of reagent solution with 100 μL of sample and mixed by repeat pipetting. The small sample analysis size of ~20 μL allowed for samples to be measured in triplicate. Further, each concentration was mixed in triplicate for a total of nine individual sample measurements per concentration point. Each data point required less than two minutes of instrument time, including a twenty second background scan and three to five, twenty-second acquisitions with a few seconds for data transmission and storage. Data was processed by subtracting the background scan from each acquisition spectrum, and then further analyzed in custom-written processing routines in Python. The Raman spectrometer is a portable unit equipped with a 785-nm laser providing approximately 60-mW of optical power at the sample, a custom-designed objective holding an aspheric lens, and thermoelectrically-cooled charge-couple-device for data acquisition. The spectrometer is cradled in a machined aluminum base which provides rugged stability as well as a pre-aligned cartridge slot for sample introduction. Custom-designed software provides instrument control and handles data acquisition and processing, returning a percent weight concentration in aqueous solutions.

Figure 7:
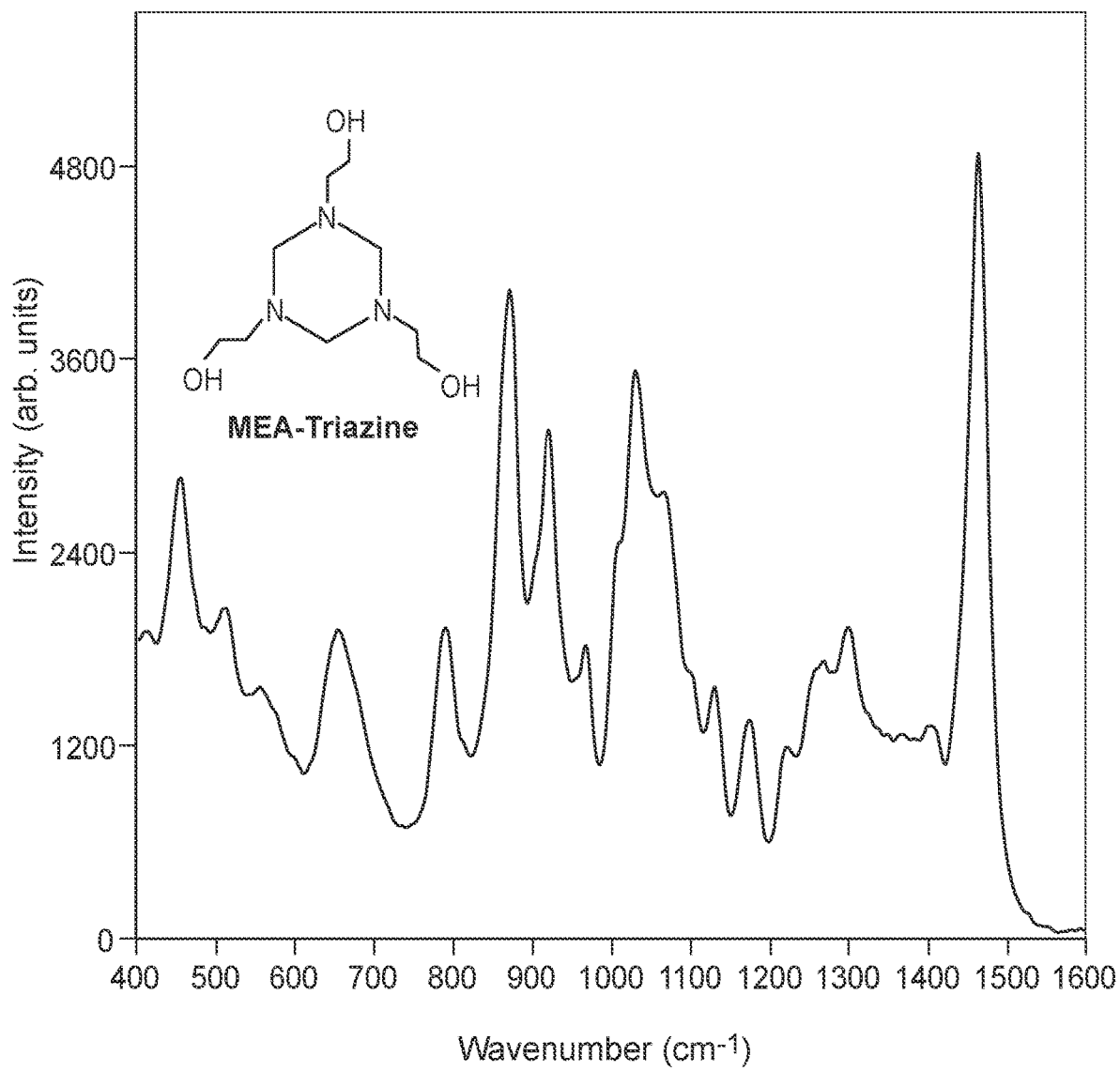
FIG. 7 shows Raman spectra of 1,3,5-tri-(2-hydroxy-ethyl)-hexahydro-s-triazine (MEA-triazine) in water at 40 wt-%. (inset) Chemical structure of MEA-triazine.

MEA-triazine provides stable and reproducible spectra both with and without the presence of the reagent compound. The MEA-triazine spectrum in aqueous solution as presented in FIG. 7. The spectra are markedly different for molecules which possess one-third structural similarity. This difference is manifested in the triplet of wide and strong peaks between 800 and 1000 relative wavenumbers (rel. $cm^{-1}$) for the MEA-triazine spectrum. These peaks are related to the ring breathing and ring-incorporated methylene hydrogen rocking vibrations for the intact triazine molecule. Once normalized to the reagent spectrum, this region is the basis of predictions for the MEA-triazine concentration prediction.

Figure 8:
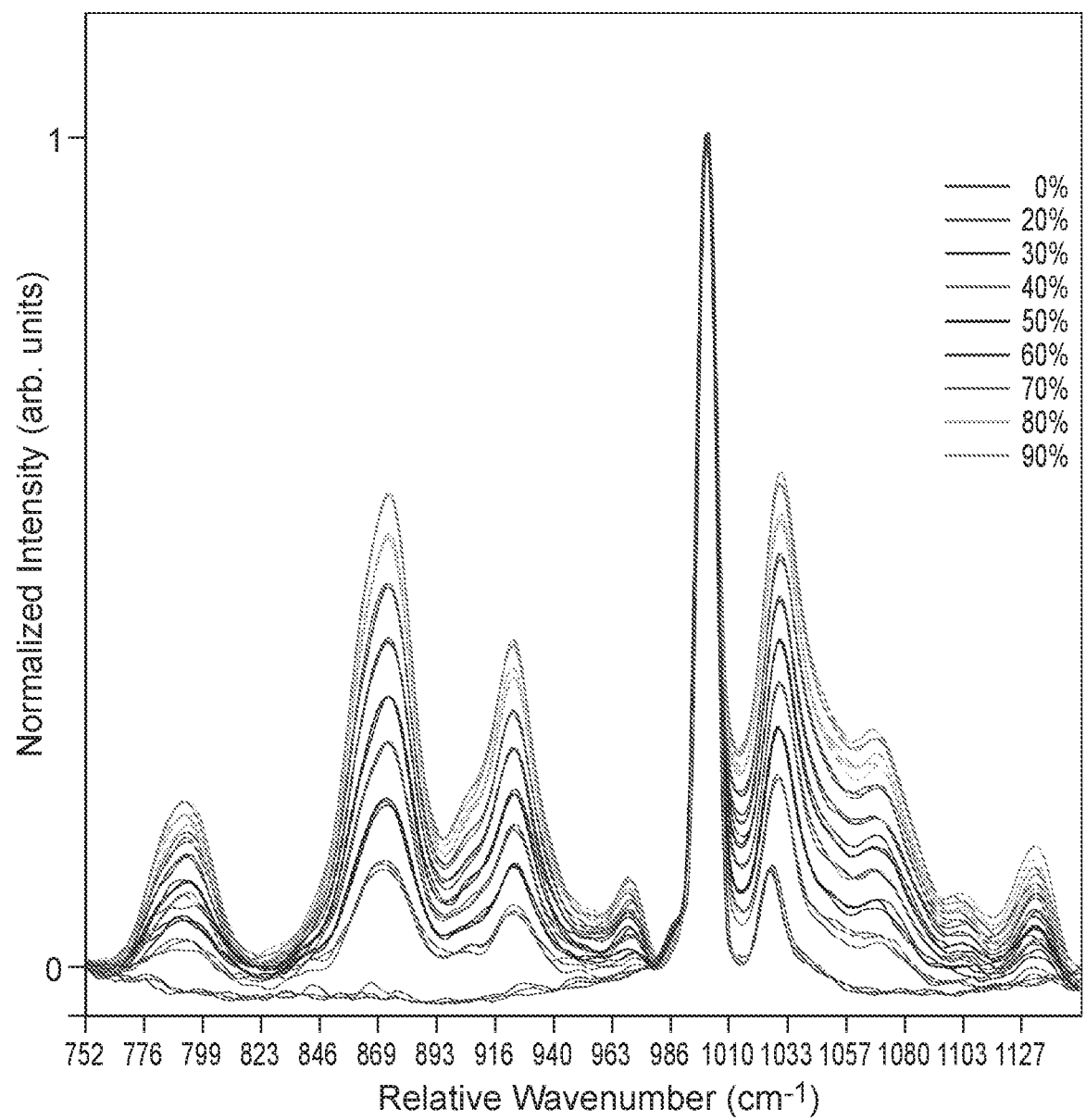
FIG. 8 shows reduced frequency range Raman spectra of triazine aqueous solutions from 10 wt-% to 90 wt-%. Each concentration is displayed in triplicate.

Focusing on the region between 800 and 1100 rel. $cm^{-1}$ in the MEA-triazine spectrum, the Raman response for a variety of concentrations from 20 to 90% by mass are illustrated in FIG. 8. Three sample spectra are presented at each concentration. Using this data and multivariate analysis tools, we are able to extract a relationship between the normalized values at a few specific points in the spectrum and the concentration of MEA-triazine in the sample. The optimal variance occurs at the 870 rel. $cm^{-1}$ peak attributed to the MEA C—C bond; however, because MEA is a reactant and a by-product during scavenging reactions, we chose the 921 rel. $cm^{-1}$ MEA-triazine ring breathing peak.

Figure 9:
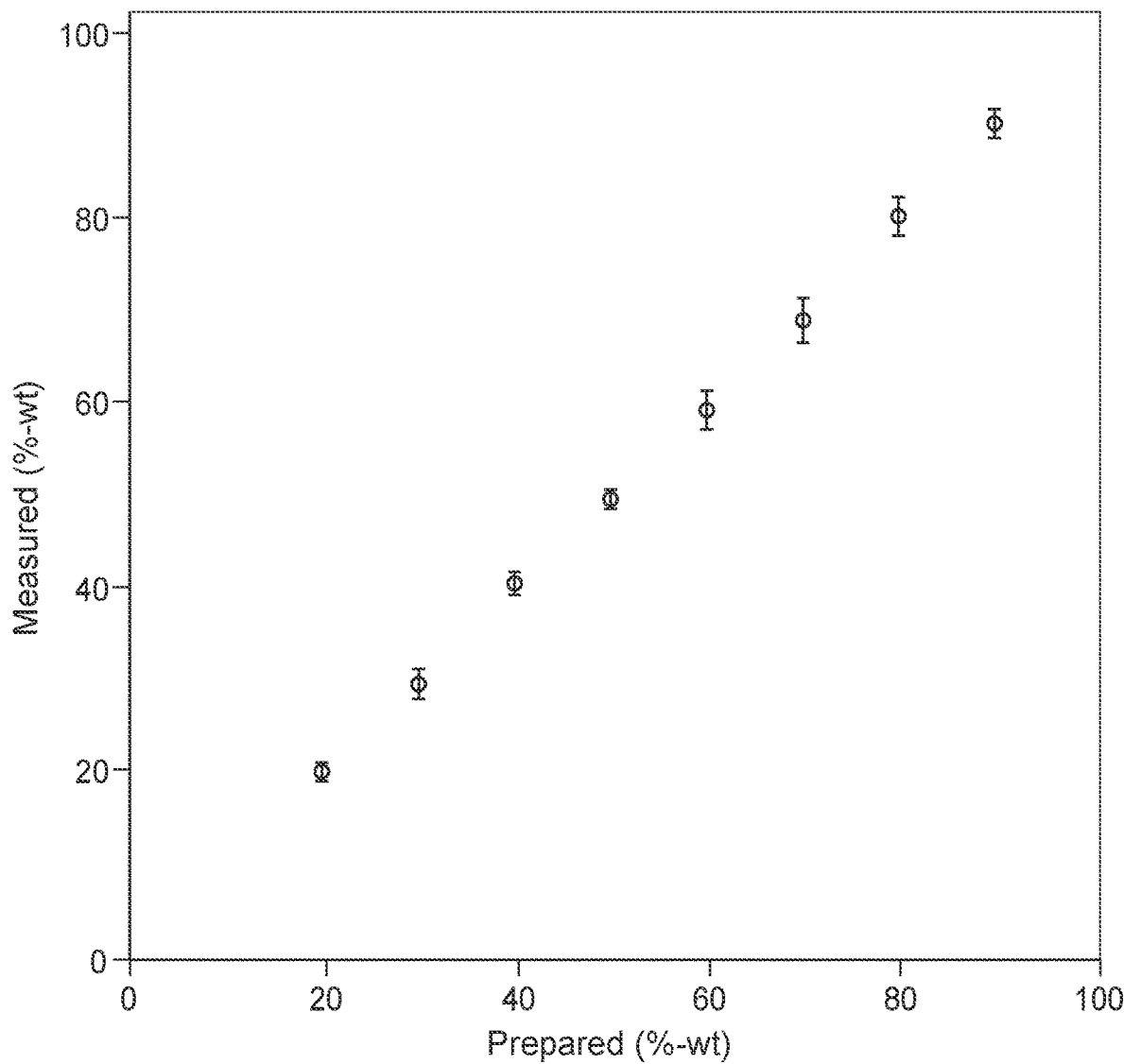
FIG. 9 shows actual versus predicted triazine concentrations for aqueous samples. Each data point is the average of two or more replicate measurements. Vertical error bars represent the standard deviation calculated for all runs.

We tested our predictive model for a series of unknown MEA-triazine samples and calculated the standard deviation for six replicate samples per validation set sample. This plot of actual versus predicted MEA-triazine concentrations is displayed in FIG. 9. The relationship between actual and predicted concentrations has unit slope, indicating good prediction of unknown MEA-triazine concentrations. Further, each prediction was within 10% of the actual value, which is a convenient accuracy specification for industrial applications. The data contained in the plot have an average relative error of 3.3%.

In manufacturing applications, MEA-triazine may be synthesized in aqueous solutions up to 80% by mass (Kelland 2014)—near the edge of the range of our previously described analysis model. More critically, high concentration solutions are challenging to measure in small volumes due to their high viscosity. The method we have described relies on the use of an internal standard to determine a ratio of triazine signal versus reagent signal which leads to a prediction of triazine concentration for an unknown sample. Given the linearity of triazine concentration versus observed Raman response, once normalized, it is possible to use different sample-to-reagent ratios and expand the usable range for the proposed analysis method. Table 1 shows results for doubling the reagent to sample concentration by adding half as much sample. This approach effectively expands the calibration curve range to 20 to 100% by mass. This data demonstrates the robust utility of this type of analytical approach by expanding the range to the higher MEA-triazine concentrations that may be encountered in the application or production of triazine-based scavengers for hydrogen sulfide scrubbing in the real world.

In the real-world applications, not all solutions of MEA-triazine are simply triazine and water. For example, it is common to add up to 25% by volume of methanol or isopropanol to expand the usable temperature range for triazine scavengers. To this end, we included spectra with added alcohols into the model generation for MEA-triazine quantification. Table 2 relates the results of two MEA-triazine solutions prepared at about 49% and 35% by mass which were first measured without added solvent. Next, we added one-fourth of the sample volume of either isopropanol or methanol (final 25% v/v alcohol in sample solution) and re-measured. Table 2 shows that the addition of isopropanol has minimal effect on MEA-triazine quantification. The addition of methanol is not as ideal as the isopropanol addition; however, the predicted value is within 10% of the actual value and provides stable readings. This demonstrates the strength of our Raman spectroscopy-based technique for concentration analysis in the presence of heterogeneous solvent systems.

The triazine manufacturing process requires mixing formaldehyde and MEA in equimolar concentrations. Although straightforward in the laboratory, this process is not trivial at manufacturing scale. The purity of industrial grade materials may not be known precisely and cost factors may require using materials of lower quality. It is also advantageous to maintain a slight excess of MEA to guarantee no free formaldehyde remains in solution for hazardous materials labeling purposes.

The Raman spectrum includes information on these reactants. We prepared small-volume MEA-triazine solutions with known levels of excess MEA and excess formaldehyde using analytical grade MEA, paraformaldehyde, and deionized water. The components were added by mass to microcentrifuge tubes, targeting approximately 1 ml of final solution for each sample. At all ratios, the reaction is highly favored and exothermic with only one excess reactant observable in any given solution.

Figure 10:
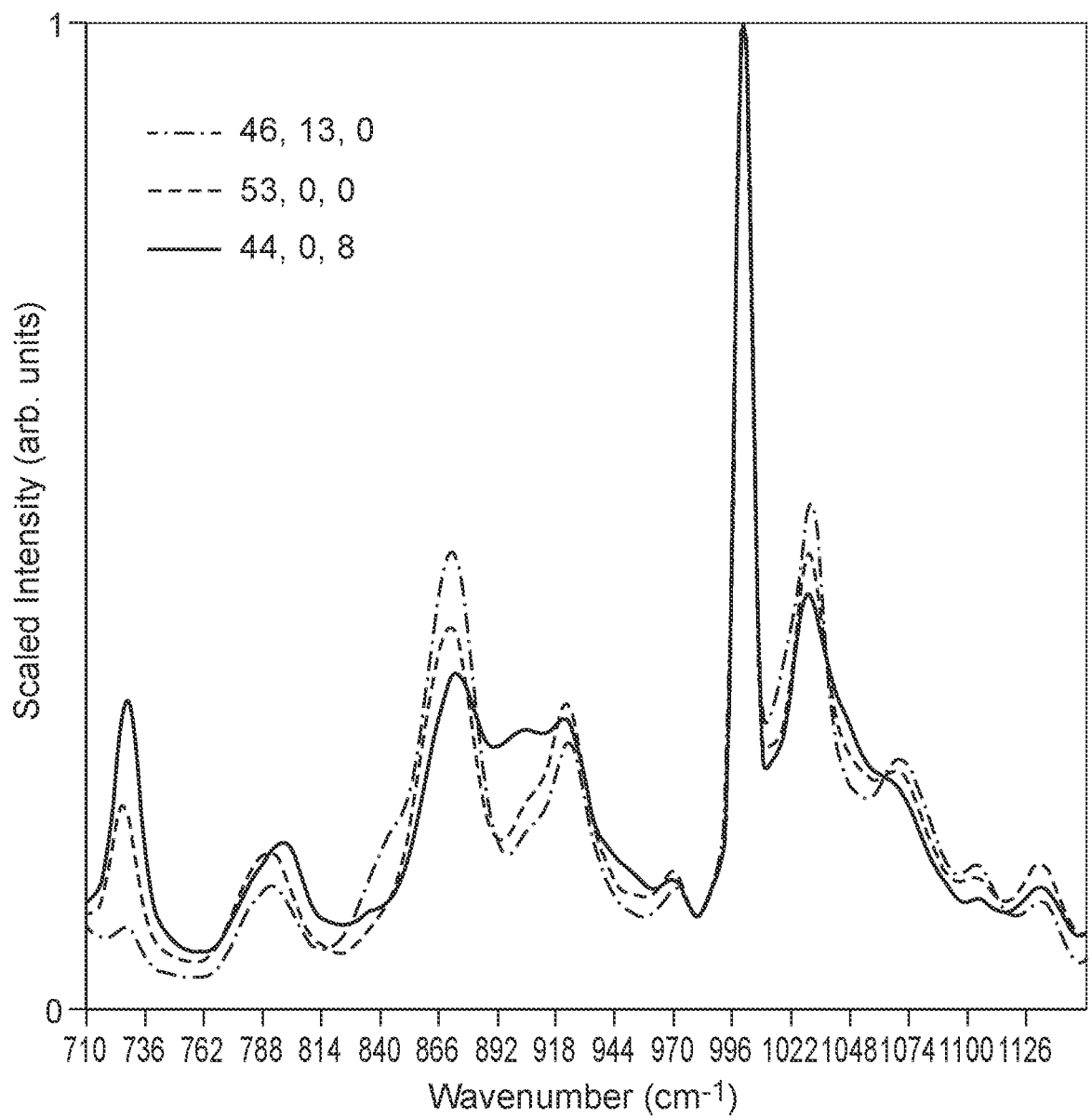
FIG. 10 shows three triazine samples with and without excess reactants. (blue) 46% MEA-triazine, 13% excess MEA, 0% excess formaldehyde; (green) 53% MEA-triazine, 0% excess MEA, 0% excess formaldehyde; (black) 44% MEA-triazine, 0% excess MEA, 8% excess formaldehyde. All spectra are scaled to the internal standard peak at 1001-$cm^{-1}$. Formaldehyde appears in the spectra most strongly at 908-$cm^{-1}$. Excess MEA appears as an increase in signal at 870-$cm^{-1}$ relative to the MEA-triazine ring breathing peak at 921-$cm^{-1}$.

Three representative spectra are presented in FIG. 10, one each for no excess reactants, excess MEA, and excess formaldehyde. Excess formaldehyde appears as a peak at 908 rel. $cm^{-1}$, between the MEA and MEA-triazine peaks. The intensity of this peak when the spectrum is normalized to the internal standard provides a direct measure of the formaldehyde concentration.

The MEA signal appears most strongly at 870 rel. $cm^{-1}$; however, this peak includes signal from the MEA bound within the MEA-triazine. By considering the ratio of the MEA-triazine ring breathing peak at 925 rel. $cm^{-1}$ to the MEA signal at 870 rel. $cm^{-1}$, we are able to determine the excess MEA concentration relative to the MEA-triazine.

Figure 11:
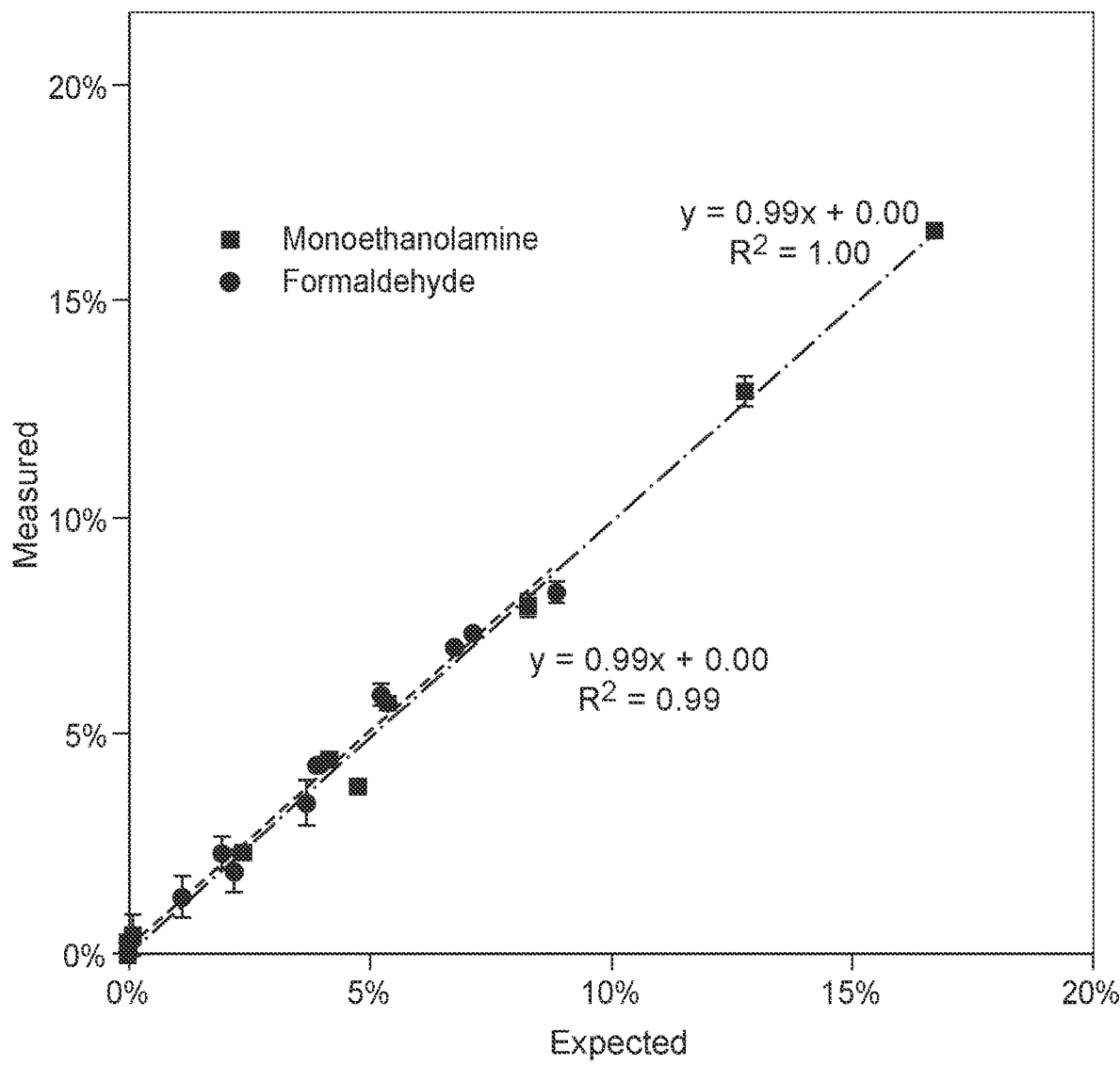
FIG. 11 shows measurement of excess reactants. The calibration curves for the two reactants allow quantitation up to 9% excess formaldehyde (circle, blue) and 17% excess MEA (square, orange).

We mapped the excess reactant concentrations to their respective signals. The results of this calculation are presented in FIG. 11. The results are linear and of unit slope. This data was prepared at ~45% by mass MEA-triazine. The calibration model can be updated for other MEA-triazine concentrations to ensure an accurate excess MEA result.

This method for MEA-triazine analysis is robust during the addition of heterogeneous solvents. Further, the model retains linearity when used at different internal standard-sample ratios, demonstrating the strength and consistency of the optical response. This information can be used by manufacturers of MEA-triazine to verify reaction performance and by oilfield operators to qualify incoming material and to create benchmarks for optimal chemical usage. This method provides a tool for definitive quantitation of MEA-triazine activity in aqueous solutions covering the range of commonly encountered concentrations.

TABLE 1

Expansion of the analysis range by modifying the sample-to-reagent ratio.

| Sample Concentration (wt-%) | Expected Concentration (wt-%) | Predicted Concentration (wt-%) |
| --- | --- | --- |
| 76.6 | 38 | 39, 39, 39 |
| 54.8 | 28 | 27, 28, 29 |
| 45.4 | 23 | 22, 22, 22 |
| 32.4 | 16 | 15, 15, 15 |

TABLE 2

Results from adding methanol (MeOH) and isopropanol (IPA) to MEA-triazine aqueous solutions. Numbers in parenthesis are one standard deviation for replicate measurements

| Sample Concentration (wt-%) | Predicted Concentration (wt-%) | With 25% (v/v) MeOH (wt-%) | With 25% (v/v) IPA (wt-%) |
| --- | --- | --- | --- |
| 49.3 | 48 (±1.1) | 45 (±0.72) | 48 (±0) |
| 34.7 | 33 (±2.3) | 32 (±0.82) | 34 (±0.58) |

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, many additional analytes may be detected using a similar approach. These metals include zinc, mercury, iron, cobalt, or nickel. Additionally, this invention extends the use of colorimetric methods through the use of SERS and standard additions. Any colorimetric analysis may be extended, including methods for calcium, magnesium, or ammonia.

All such variations are considered to be within the scope and spirit of the present invention as defined by the following claims and their legal equivalents.

A list of the publications cited herein is provided below. The publications listed below are incorporated herein by reference.

REFERENCES

Benhabib, M., K. P. Tran, S. L. Kleinman, N. Zherebnenko and M. C. Peterman (2015). *Surface-Enhanced Raman Spectroscopy for Rapid and Cost-Effective Quantification of Amines in Sour Water*. Abu Dhabi International Petroleum Exhibition and Conference, Society of Petroleum Engineers.

Cooper, J. B., M. Abdelkader and K. L. Wise (2013). "Sequentially shifted excitation Raman spectroscopy: novel algorithm and instrumentation for fluorescence-free Raman spectroscopy in spectral space." *Applied spectroscopy* 67(8): 973-984.

Eaton, A. D., L. S. Clesceri, E. W. Rice and A. E. Greenberg, Eds. (2005). *Standard Methods for the Examination of Water and Wastewater*.

Friedman, J. H. (1991). "Multivariate adaptive regression splines." *The annals of statistics*: 1-67.

Jeanmaire, D. L. and R. P. Van Duyne (1977). "Surface Raman spectroelectrochemistry: Part I. Heterocyclic, aromatic, and aliphatic amines adsorbed on the anodized silver electrode." *Journal of electroanalytical chemistry and interfacial electrochemistry* 84(1): 1-20.

Kelland, M. A. (2014). Production Chemicals for the oil and gas industry, CRC Press.

Kleinman, S. L., R. R. Frontiera, A.-I. Henry, J. A. Dieringer and R. P. Van Duyne (2013). "Creating, characterizing, and controlling chemistry with SERS hot spots." *Physical Chemistry Chemical Physics* 15(1): 21-36.

Kleinman, S. L., M. C. Peterman, M. Benhabib, M. T. Cheng, J. D. Hudson and R. E. Mohler (2017). "Rapid Quantification of 4,4'-Methylenedianiline by Surface-Enhanced Raman Spectroscopy." *Analytical Chemistry*.

Kleinman, S. L., B. Sharma, M. G. Blaber, A.-I. Henry, N. Valley, R. G. Freeman, M. J. Natan, G. C. Schatz and R. P. Van Duyne (2013). "Structure enhancement factor relationships in single gold nanoantennas by surface-enhanced Raman excitation spectroscopy." *Journal of the American Chemical Society* 135(1): 301-308.

Kumar, S., K. S. Gandhi and R. Kumar (2007). "Modeling of Formation of Gold Nanoparticles by Citrate Method." *Industrial & Engineering Chemistry Research* 46(10): 3128-3136.

Langer, J., D. Jimenez de Aberasturi, J. Aizpurua, R. A. Alvarez-Puebla, B. Auguié, J. J. Baumberg, G. C. Bazan, S. E. Bell, A. Boisen and A. G. Brolo (2019). "Present and future of surface-enhanced Raman scattering." *ACS nano* 14(1): 28-117.

Stiles, P. L., J. A. Dieringer, N. C. Shah and R. P. Van Duyne (2008). "Surface-enhanced Raman spectroscopy." *Annu. Rev. Anal. Chem.* 1: 601-626.

We claim:

1. A method to measure an analyte in water comprising the steps of:
providing a sample containing a quantity of said analyte;
mixing an internal standard with the sample, wherein the internal standard comprises an isotope;
analyzing the sample with a Raman spectrometer to produce a measured spectrum of the sample; and,
determining a concentration of the analyte using the measured spectrum and a calibration curve wherein the calibration curve is one or more of a) a multivariate calibration curve and b) a calibration curve prepared with samples containing the analyte and the internal standard;
wherein determining a concentration of the analyte using the measured spectrum comprises:
collecting multiple spectra of the sample at multiple excitation wavelengths,
obtaining variant and invariant spectra, and
determining concentration of the analyte using the variant spectrum.

2. The method of claim 1 wherein determining the concentration comprises a multivariate adaptive regressive splines technique, a partial least squares technique, or a polynomial fit.

3. The method of claim 1 wherein the calibration curve is determined considering spectra of the analyte at different known concentrations and the internal standard at a known concentration, wherein the internal standard is added in the same amount or concentration as will be used to make the measurement, wherein the spectra are scaled to a peak of the internal standard.

4. The method of claim 1 comprising the steps of producing at least one dark spectrum without laser excitation, and subtracting the dark spectrum from the measured spectrum.

5. The method of claim 1 comprising shifting the measured spectrum such that the measured spectrum has a peak in a known location for the isotope.

6. The method of claim 1 comprising scaling the measured spectrum using a peak for the isotope and a known concentration of the isotope in the sample.

7. The method of claim 1 comprising subtracting spectra for one or more interfering compounds in the sample.

8. The method of claim 7 wherein the analyte is monoethanolamine and the interfering compounds are one or more of dimethylethanolamine, methylamine, and 3-methoxypropylamine.

9. The method of claim 7 comprising comparing minimization coefficients for an interfering compounds to the isotope to determine a concentration of the interfering compound.

10. The method of claim 1 wherein collecting multiple spectra of the sample at multiple excitation wavelengths comprises at least one of: using an array of lasers or adjusting the temperature of a single laser.

11. The method of claim 1 comprising calculating a detection limit for the sample.

12. The method of claim 1 wherein the analyte is MEA and the isotope is MEA-$d_4$.

13. The method of claim 1 wherein the analyte is MMA and the isotope is MMA-$d_3$.

14. The method of claim 1 comprising treating the sample by way of anion-exchange based solid phase extraction.

15. The method of claim 14 wherein the analyte is an amine and the sample is acidic during the sample phase extraction.

16. The method of any claim 1 wherein the sample has a pH of at least 2 greater than the pKa of the analyte while analyzing the sample with the Raman spectrometer.

17. A method to measure an analyte in water comprising the steps of:
providing an original sample containing a quantity of said analyte;
mixing one or more known amounts of the analyte with the sample to produce at least one additional sample;

analyzing the original sample and the at least one additional sample with a Raman spectrometer to produce measured spectra of the samples; and, determining a concentration of the analyte using the measured spectra wherein determining a concentration of the analyte using the measured spectra comprises:

collecting multiple spectra of the sample at multiple excitation wavelengths, obtaining variant and invariant spectra, and determining concentration of the analyte using the variant spectrum.

18. The method of claim 17 wherein the analyte is a metal such as lead, copper, zinc, mercury, iron, cobalt, nickel or a colorimetric method for calcium magnesium or ammonia.

19. A method of measuring the concentration of MEA-triazine in a sample comprising adding a Raman-active compound containing a phenyl group to the sample and producing a Raman spectra of the sample.

20. The method of claim 19 wherein concentration of the MEA-triazine is in the range of 30-80% by mass.

* * * * *